US012425757B2

(12) United States Patent
Jang et al.

(10) Patent No.: US 12,425,757 B2
(45) Date of Patent: Sep. 23, 2025

(54) ELECTRONIC DEVICE AND METHOD FOR OPERATING ELECTRONIC DEVICE

(71) Applicant: Samsung Electronics Co., Ltd., Suwon-si (KR)

(72) Inventors: Youngsang Jang, Suwon-si (KR); Yongseok Bang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 336 days.

(21) Appl. No.: 18/159,348

(22) Filed: Jan. 25, 2023

(65) Prior Publication Data

US 2023/0164473 A1 May 25, 2023

Related U.S. Application Data

(63) Continuation of application No. PCT/KR2021/008352, filed on Jul. 1, 2021.

(30) Foreign Application Priority Data

Jul. 31, 2020 (KR) ........................ 10-2020-0096386

(51) Int. Cl.
*H04R 1/10* (2006.01)
*H04R 5/033* (2006.01)

(52) U.S. Cl.
CPC ......... *H04R 1/1016* (2013.01); *H04R 1/1083* (2013.01); *H04R 5/033* (2013.01); *H04R 2420/07* (2013.01); *H04R 2430/01* (2013.01); *H04R 2460/01* (2013.01)

(58) Field of Classification Search
CPC .... H04R 1/1016; H04R 1/1083; H04R 5/033; H04R 2420/07; H04R 2430/01; H04R 2460/01
USPC ..... 381/74, 58, 364, 375, 380, 91, 122, 111, 381/98, 104, 103, 71.1, 71.6, 94.1, 94.2
See application file for complete search history.

(56) References Cited

U.S. PATENT DOCUMENTS 9,232,308 B2 1/2016 Murata et al.
9,319,781 B2 4/2016 Alderson et al.
9,648,410 B1 * 5/2017 Kratsas ................ H04R 1/1041

(Continued)

FOREIGN PATENT DOCUMENTS

JP 2007-165940 A 6/2007
JP 2014-033303 A 2/2014

(Continued)

OTHER PUBLICATIONS

Korean Office Action dated May 22, 2024, issued in Korean Patent Application No. 10-2020-0096386.

*Primary Examiner* — Vivian C Chin
*Assistant Examiner* — Con P Tran
(74) *Attorney, Agent, or Firm* — Jefferson IP Law, LLP

(57) ABSTRACT

An electronic device is provided. The electronic device includes a housing formed so as to be worn in at least a part of a user's body, at least one microphone, a speaker, at least one sensor, and at least one processor operatively connected to the at least one microphone, the speaker, and the at least one sensor. The at least one processor recognizes a state of the electronic device worn in at least the part of the user's body using at least one of the at least one microphone, the speaker, and the at least one sensor, and controls a function of the electronic device based on the worn state.

14 Claims, 20 Drawing Sheets

(56) References Cited

U.S. PATENT DOCUMENTS

| | | | |
|---|---|---|---|
| 10,178,485 B2 | 1/2019 | Lee et al. | |
| 10,354,639 B2 | 7/2019 | Scanlan | |
| 10,701,499 B2 | 6/2020 | Usher et al. | |
| 10,714,073 B1 * | 7/2020 | Rui | G10K 11/17813 |
| 10,764,669 B2 | 9/2020 | Kim | |
| 10,939,218 B2 | 3/2021 | Lee et al. | |
| 10,979,836 B2 | 4/2021 | Usher et al. | |
| 11,056,093 B2 | 7/2021 | Scanlan | |
| 11,140,486 B2 | 10/2021 | Bae et al. | |
| 11,308,977 B2 | 4/2022 | Moon et al. | |
| 2015/0341717 A1 | 11/2015 | Song et al. | |
| 2018/0132048 A1 | 5/2018 | Usher et al. | |
| 2019/0166428 A1 | 5/2019 | Bae et al. | |
| 2019/0306613 A1 * | 10/2019 | Qian | H04R 1/1091 |
| 2020/0107104 A1 | 4/2020 | Kim | |
| 2020/0202839 A1 | 6/2020 | Asada et al. | |
| 2021/0195307 A1 * | 6/2021 | Steele | H04R 1/265 |
| 2022/0086555 A1 | 3/2022 | Narisawa et al. | |
| 2022/0139366 A1 | 5/2022 | Asada et al. | |

FOREIGN PATENT DOCUMENTS

| | | | |
|---|---|---|---|
| JP | 2019-054337 | A | 4/2019 |
| JP | 2019-220882 | A | 12/2019 |
| JP | 2020-120332 | A | 8/2020 |
| KR | 10-2015-0139306 | A | 12/2015 |
| KR | 10-2017-0030366 | A | 3/2017 |
| KR | 10-1803306 | B1 | 11/2017 |
| KR | 10-2018-0062270 | A | 6/2018 |
| KR | 10-2019-0061681 | A | 6/2019 |
| KR | 10-2019-0087438 | A | 7/2019 |
| KR | 10-2031537 | B1 | 10/2019 |
| KR | 10-2020-0085030 | A | 7/2020 |

* cited by examiner

ELECTRONIC DEVICE AND METHOD FOR OPERATING ELECTRONIC DEVICE

CROSS-REFERENCE TO RELATED APPLICATION(S)

This application is a continuation application, claiming priority under § 365(c), of an International application No. PCT/KR2021/008352, filed on Jul. 1, 2021, which is based on and claims the benefit of a Korean patent application number 10-2020-0096386, filed on Jul. 31, 2020, in the Korean Intellectual Property Office, the disclosure of which is incorporated by reference herein in its entirety.

BACKGROUND

1. Field

The disclosure relates to a technology for controlling a function of an electronic device based on a state of the electronic device.

2. Description of Related Art

With a recent development of a technology, audio output devices, such as earphones and headphones that provide wireless communication have been widely used. In addition, recently, kernel-type audio output devices capable of providing a noise canceling function (e.g., active noise cancellation (ANC)) for blocking ambient noise have been popularized.

The above information is presented as background information only to assist with an understanding of the disclosure. No determination has been made, and no assertion is made, as to whether any of the above might be applicable as prior art with regard to the disclosure.

SUMMARY

An electronic device (e.g., earphone) that a user may wear may provide a single wearing state. The user must wear the electronic device only in a prescribed manner, and there may be inconvenience in controlling a function of the electronic device.

Aspects of the disclosure are to address at least the above-mentioned problems and/or disadvantages and to provide at least the advantages described below. Accordingly, an aspect of the disclosure is to provide an electronic device that provides a plurality of wearing states.

Another aspect of the disclosure is to provide an electronic device and a method of operating thereof that control a function of the electronic device based on a state in which a user is wearing the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing formed so as to be worn in at least a part of a user's body, at least one microphone, a speaker, at least one sensor, and at least one processor operatively connected to the at least one microphone, the speaker, and the at least one sensor. According to an embodiment of the disclosure, the at least one processor recognizes a state of the electronic device worn in at least the part of the user's body using at least one of the at least one microphone, the speaker, and the at least one sensor, and controls a function of the electronic device based on the worn state.

In accordance with another aspect of the disclosure, a method of operating an electronic device including a housing formed so as to be worn in at least a part of a user's body, at least one microphone, a speaker, and at least one sensor is provided. The method includes recognizing a state of the electronic device worn in at least the part of the user's body using at least one of the at least one microphone, the speaker, and the at least one sensor, and controlling a function of the electronic device based on the worn state.

According to the embodiments of the disclosure, the electronic device that provides the plurality of wearing states may be provided.

According to the embodiments of the disclosure, the electronic device and the method thereof that may control the function of the electronic device based on the state in which the user is wearing the electronic device may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
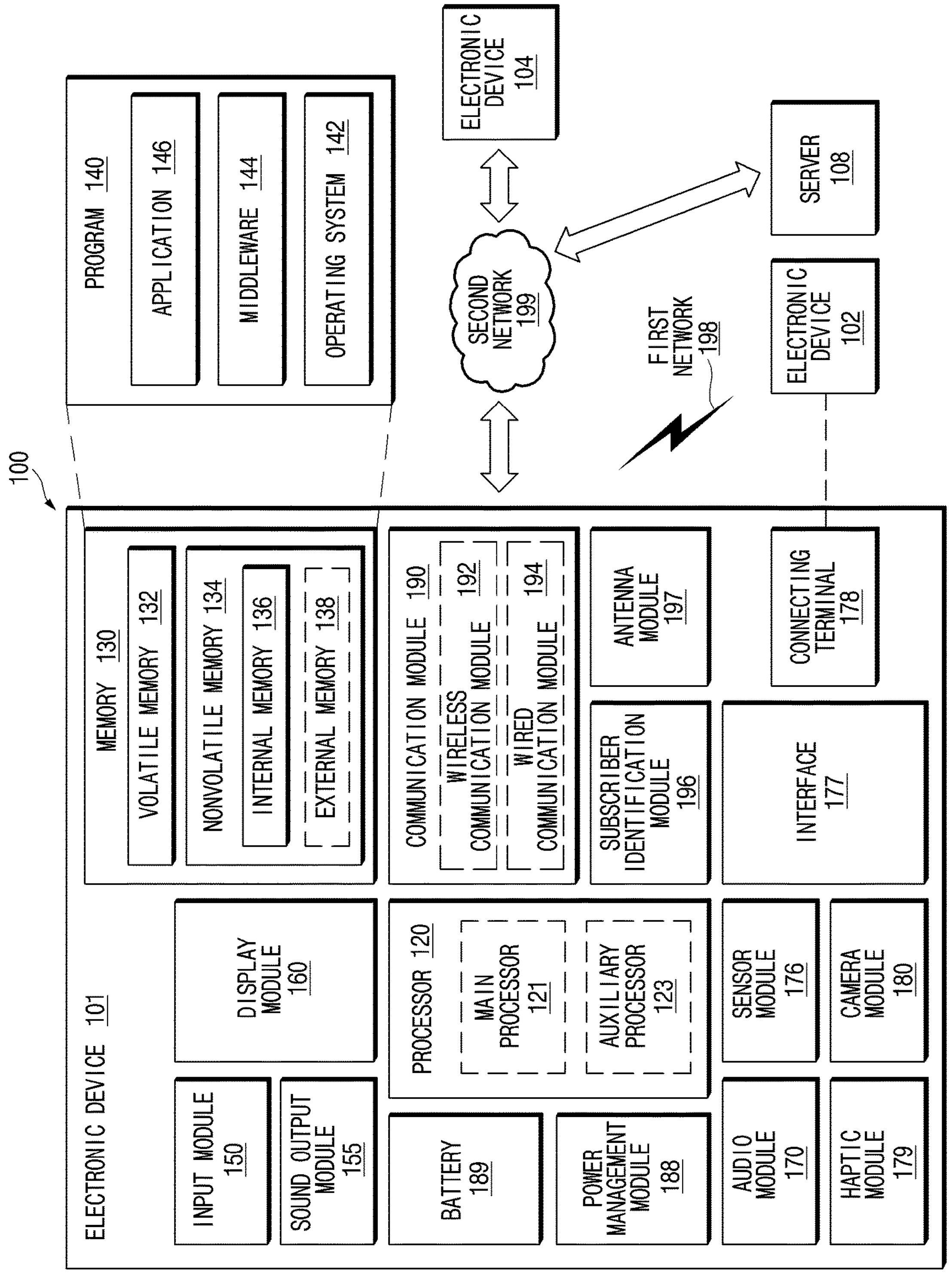
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added in the electronic device 101. In some embodiments of the disclosure, some of the components may be implemented as single integrated circuitry. For example, some (e.g., the sensor module 176, the camera module 180, or the antenna module 197) of the components may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. When the electronic device 101 includes the main processor 121 and the auxiliary processor, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specialized for the processing of an artificial intelligence model. The artificial intelligence model may be created through machine learning. The learning may be performed, for example, in the electronic device 101 itself on which the artificial intelligence model is executed or may be performed through a separate server (e.g., the server 108). The learning algorithm may include, for example, supervised learning, unsupervised learning, semi-supervised learning, or reinforcement learning, but the disclosure is not limited to the above examples. The artificial intelligence model may include a plurality of artificial neural network layers. The artificial neural network include a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above networks, but the disclosure is not limited to the above examples. Additionally or alternatively, the artificial intelligence model may include a software structure in addition to the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (WiFi) direct, or infrared data association (IrDA)) or the second network 199 (e.g., a long-range communication network, such as a legacy cellular network, fifth generation (5G) network, next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network after a fourth generation (4G) network and a next-generation communication technology, for example, a new radio (NR) access technology. The NR access technology may support enhanced mobile broadband (eMBB), massive machine type communications (mMTC), or ultra-reliable and low-latency communications ((URLLC). The wireless communication module 192 may support a high-frequency band (e.g., millimeter wave (mmWave) band) to implement a high data rate, for example. The wireless communication module 192 may support various technologies for securing performance in a high frequency band, for example, beam-forming, massive multiple-input and multiple-output (MIMO), full-dimensional MIMO (FD-MIMO), array antenna, analog beam-forming, and large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing the eMBB, loss coverage (e.g., 164 dB or less) for implementing the mMTC, or U-plane latency (e.g., downlink (DL) and uplink (UL) each being 0.5 ms or less or round trip being 1 ms or less) for implementing the URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas (e.g., an array antenna). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form an mmWave antenna module. According to an embodiment of the disclosure, the mmWave antenna module may include a printed circuit board, an RFIC disposed on a first surface (e.g., a bottom (or lower) surface) of the printed circuit board or adjacent thereto and capable of supporting a specified high frequency band (e.g., an mmWave band), and a plurality of antennas (e.g., an array antenna) disposed on a second surface (e.g., a top (or upper) surface) of the printed circuit board and capable of transmitting or receiving signals of the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide, for example, an ultra-low latency service by using distributed computing or mobile edge computing. In another embodiment of the disclosure, the external electronic device 104 may include an Internet of things (IoT) device. The server 108 may be an intelligent server that uses machine learning and/or a neural network. According to an embodiment of the disclosure, the external electronic device 104 or the server 108 may be included in the second network 199. The electronic device 101 may be applied to an intelligent service (e.g., smart home, smart city, smart car, or health care) based on the 5G communication technology and IoT-related technology.

Figure 2:
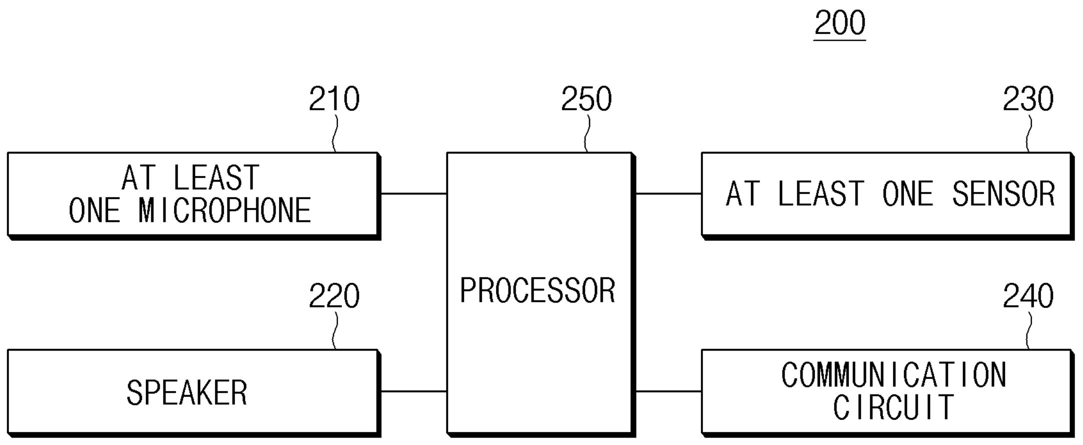
FIG. 2 is a block diagram of an electronic device according to an embodiment of the disclosure.

FIG. 2 is a block diagram of an electronic device according to an embodiment of the disclosure.

According to an embodiment of the disclosure, an electronic device (e.g., the electronic device 101 in FIG. 1) may include at least one microphone 210 (e.g., the input module 150 in FIG. 1), a speaker 220 (e.g., the sound output module 155 in FIG. 1), at least one sensor 230 (e.g., the sensor module 176 in FIG. 1), a communication circuit 240 (e.g., the communication module 190 in FIG. 1), and a processor 250 (e.g., the processor 120 in FIG. 1).

According to an embodiment of the disclosure, the at least one microphone 210 may receive and/or sense an external sound of an electronic device 200. According to an embodiment of the disclosure, the electronic device 200 may include a first microphone and a second microphone. According to an embodiment of the disclosure, the first microphone and the second microphone may be disposed to be spaced apart from each other by a specified spacing. According to an embodiment of the disclosure, the first microphone may be a microphone (e.g., a feedforward microphone) for sensing and/or receiving the external sound of the electronic device 200, and the second microphone may be a microphone (e.g., a feedback microphone) for sensing and/or receiving a sound output from the speaker 220.

According to an embodiment of the disclosure, the first microphone and the second microphone may recognize a state in which a user is wearing the electronic device 200.

According to an embodiment of the disclosure, the speaker 220 may output the sound under control of the processor 250. For example, the speaker 220 may output a sound related to an audio content received from an external electronic device (e.g., the external electronic devices 102 and 104 and/or the server 108 in FIG. 1). For example, the speaker 220 may adjust a volume of the output sound under the control of the processor 250.

According to an embodiment of the disclosure, the at least one sensor 230 may include a proximity sensor or a contact sensor. According to an embodiment of the disclosure, when the electronic device 200 is worn in at least a part of a user's body, the at least one sensor 230 may sense a distance from the user's body.

According to an embodiment of the disclosure, the communication circuit 240 may transmit and receive data to and from the external electronic device. For example, the communication circuit 240 may receive audio data from the external electronic device. For example, the communication circuit 240 may transmit a state of the electronic device 200 (e.g., an activation state of an ANC function and/or the state in which the electronic device 200 is worn) or data (e.g., a result of performing an operation (a function) of the electronic device 200) related to the performing of the operation (the function) to the external electronic device.

According to an embodiment of the disclosure, the processor 250 may control the operation of the electronic device 200. For example, the processor 250 may control a noise cancellation function of the electronic device 200. For example, the noise cancellation function may include the active noise cancellation (ANC) function of obtaining noise included in an ambient sound of the electronic device 200 and removing the noise using an anti-noise signal having an inverse phase of the obtained noise included in the ambient sound. According to various embodiments of the disclosure, the processor 250 may perform the ANC function in a feedforward, feedback, or hybrid manner According to an embodiment of the disclosure, the processor 250 may control an ambient sound listening (transparency) function (e.g., an ambient sound permissive mode). For example, the processor 250 may receive and/or obtain the ambient sound of the electronic device 200 using the at least one microphone 210. For example, the processor 250 may adjust a volume of the ambient sound obtained via the at least one microphone 210. For example, the ambient sound adjusted by the processor 250 may be output at an appropriate volume via the speaker 220. For example, based on the ambient sound listening function of the electronic device 200, as the external sound of the electronic device 200 is output via the speaker 220 together with an audio signal received from the external electronic device (not shown) (e.g., a mobile device, a desktop, or a PC), the user may receive the external sound with the appropriate volume and sound quality while wearing the electronic device 200.

According to an embodiment of the disclosure, the processor 250 may recognize the state in which the user is wearing the electronic device 200 using the at least one microphone 210, the speaker 220, and the at least one sensor 230. According to an embodiment of the disclosure, the state in which the user is wearing the electronic device 200 may include a first wearing state and a second wearing state. For example, the second wearing state may be a state in which the electronic device 200 is worn more deeply inside the part of the user's body (e.g., an ear) compared to the first wearing state.

For example, the processor 250 may output a low-frequency signal equal to or lower than a specified frequency in a direction of the user's body via the speaker 220. For example, the low-frequency signal may be a signal of a frequency band lower than an audible range of the user. For example, the low-frequency signal output via the speaker 220 may be reflected from the user's body. For example, the low-frequency signal reflected from the user's body may be received via the at least one microphone 210. For example, the processor 250 may recognize the state in which the user is wearing the electronic device 200 based on the low-frequency signal received via the microphone. According to an embodiment of the disclosure, the processor 250 may determine a volume of the sound received via the microphone compared to a volume of the low-frequency signal (that is, a low-frequency sound) output via the speaker, and recognize the state in which the electronic device 200 is worn based on the determination. For example, when the low-frequency signal with the volume of 10 is output via the speaker and the volume of the signal received via the microphone is 5, the processor 250 may recognize the worn state of the electronic device 200 as the first wearing state. In addition, when the low-frequency signal with the volume of 10 is output via the speaker and the volume of the signal received via the microphone is 9, the processor 250 may recognize the worn state of the electronic device 200 as the second wearing state. For example, the first wearing state is a state in which the electronic device 200 is less closely in contact with the user's body (e.g., the ear) compared to the second wearing state, and thus, the signal (the sound) reflected from the user's body may escape outside the user's ear, so that the volume of the signal received via the microphone relative to the volume of the low-frequency signal output via the speaker may be relatively lower than in the second wearing state. According to an embodiment of the disclosure, the processor 250 may deactivate the noise cancellation function or compensate for a performance of the noise cancellation function and/or an equalizer when recognizing the first wearing state.

For example, when each of the first microphone and the second microphone receives the external sound of the electronic device 200, the processor 250 may recognize the state in which the user is wearing the electronic device 200 based on a difference between a volume of the sound received by the first microphone and a volume of the sound received by the second microphone. For example, when the first microphone and the second microphone are disposed to be spaced apart from each other by the specified spacing, even for the same external sound, the volumes of the sounds received by the first microphone and the second microphone may be different from each other depending on the user's wearing state. For example, when the difference in the volume of the sound received by the first microphone and the second microphone is lower than a specified value, the processor 250 may recognize the worn state of the electronic device 200 as the first wearing state. In addition, when the difference in the volume of the sound received by the first microphone and the second microphone is equal to or higher than the specified value, the processor 250 may recognize the worn state of the electronic device 200 as the second wearing state.

According to an embodiment of the disclosure, the processor 250 may recognize the state in which the user is wearing the electronic device 200 based on a value sensed using the at least one sensor 230. For example, the electronic device 200 may recognize the worn state of the electronic device 200 based on the distance between the electronic device 200 and the user's body measured using the at least one sensor 230. For example, when a value measured using the proximity sensor is equal to or higher than a specified value, the processor 250 may recognize the worn state of the electronic device 200 as the first wearing state. In addition, when the value measured using the proximity sensor is lower than the specified value, the processor 250 may recognize the worn state of the electronic device 200 as the second wearing state. For example, when a contact resistance is not measured by the contact sensor, the processor 250 may recognize the worn state of the electronic device 200 as the first wearing state. In addition, when the contact resistance is measured by the contact sensor, the processor 250 may recognize the worn state of the electronic device 200 as the second wearing state. For example, when the value measured using the proximity sensor is equal to or higher than the specified value and the contact resistance is not measured by the contact sensor, the worn state of the electronic device 200 may be recognized as the first wearing state. When the value measured using the proximity sensor is lower than the specified value and the contact resistance is measured by the contact sensor, the worn state of the electronic device 200 may be recognized as the second wearing state. According to various embodiments of the disclosure, a type of the sensor used by the processor 250 is not limited to the proximity sensor or the contact sensor. The processor 250 may recognize the worn state of the electronic device 200 using various sensors other than the proximity sensor or the contact sensor.

According to an embodiment of the disclosure, the processor 250 may control the function of the electronic device 200 based on the state in which the user is wearing the electronic device 200. According to an embodiment of the disclosure, the processor 250 may activate the noise cancellation function or maintain settings of the noise cancellation function and/or the equalizer as default settings when recognizing the second wearing state. According to various embodiments of the disclosure, the volume value of the sound is an example and is not limited thereto, and a reference value of the volume of the output sound and/or the volume of the received sound may be changed.

For example, the processor 250 may deactivate the noise cancellation function when the worn state of the electronic device 200 is the first wearing state, and activate the noise cancellation function when the worn state of the electronic device 200 is the second wearing state.

For example, the processor 250 may adjust the volume of the sound output via the speaker 220 based on the state in which the user is wearing the electronic device 200. For example, even when the user sets the same sound setting value (e.g., the volume value of the sound), the user may feel that the volume of the sound output via the speaker 220 is different depending on the state in which the electronic device 200 is worn. For example, the processor 250 may increase the volume of the sound output via the speaker 220 in the first wearing state (e.g., the state in which the electronic device 200 is worn less deeply in the user's body (e.g., the ear)) or may decrease the volume of the sound output via the speaker 220 in the second wearing state (e.g., the state in which the electronic device 200 is worn more deeply in the user's body (e.g., the ear)). For example, the processor 250 may adjust the volume of the sound output via the speaker 220 such that the user recognizes that the volume of the sound output via the speaker 220 is the same even when the wearing state is changed.

For example, the processor 250 may adjust characteristics (e.g., the equalizer (EQ)) of the sound output via the speaker 220 based on the state in which the user is wearing the electronic device 200. For example, when the characteristics of the sound output via the speaker 220 is set in the state in which the user is wearing the electronic device 200, the processor 250 may output a sound having the specified sound characteristic based on the change in the worn state of the electronic device 200.

According to various embodiments of the disclosure, the electronic device 200 may further include at least some of the components of the electronic device 101 shown in FIG. 1.

Figure 3:
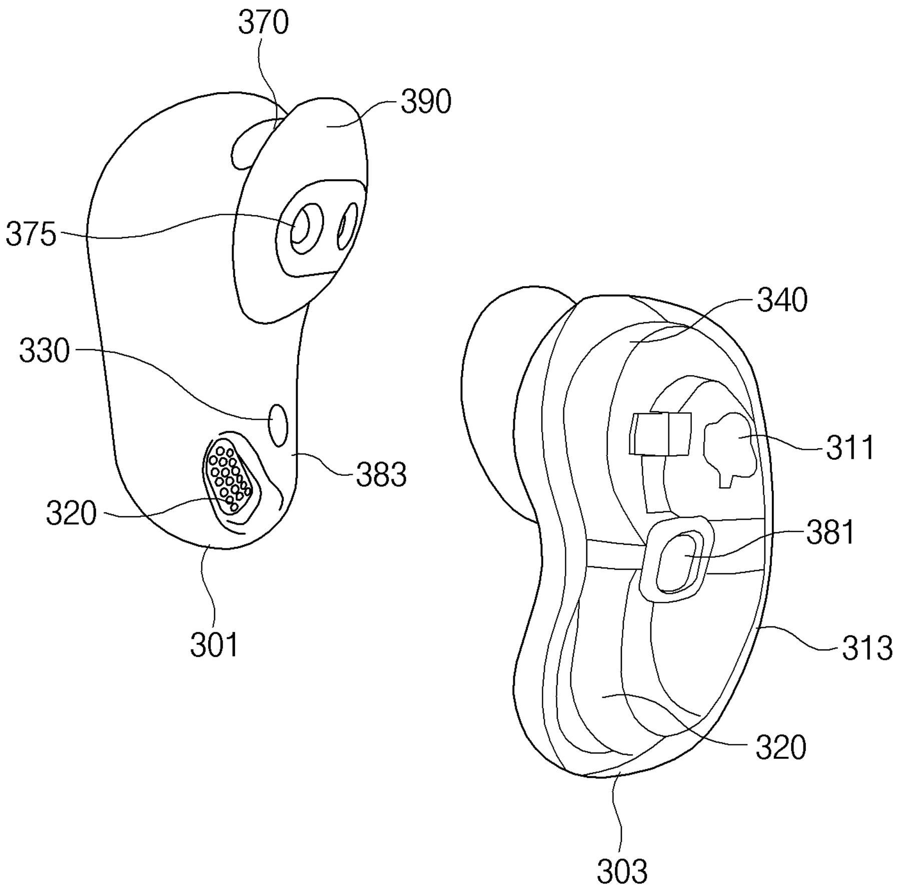
FIG. 3 is a perspective view of an electronic device according to an embodiment of the disclosure.

FIG. 3 is a perspective view of an electronic device according to an embodiment of the disclosure.

According to an embodiment of the disclosure, electronic devices 301 and 303 (e.g., the electronic device 101 in FIG. 1 or the electronic device 200 in FIG. 2) may output an audio signal (e.g., a sound). For example, the electronic devices 301 and 303 may be headphones, headsets, and/or an earset, and earphones, but the disclosure may not be limited thereto. For example, the electronic devices 301 and 303 may include various types of devices (e.g., a hearing aid, a small speaker 320, or a portable sound device) that receive the audio signal from the external electronic device and output the received audio signal.

According to an embodiment of the disclosure, a housing of each of the electronic devices 301 and 303 may form at least a portion of an outer appearance of each of the electronic devices 301 and 303. According to an embodiment of the disclosure, the electronic devices 301 and 303 may be worn in at least the part of the user's body. For example, at least a portion of the housing of each of the electronic devices 301 and 303 may be inserted into the user's ear. For example, a peripheral region in which the speaker 320 is disposed of the housing of each of the electronic devices 301 and 303 may be inserted into the user's ear. For example, a pair of electronic devices 301 and 303 may be worn in both ears of the user. For example, the first electronic device 301 may be worn in one ear of the user, and the second electronic device 303 may be worn in the other ear of the user. As another example, the first electronic device 301 and the second electronic device 303 may be respectively worn in ears of different users.

According to an embodiment of the disclosure, the electronic devices 301 and 303 may be constructed as a substantially symmetrical pair. For example, the first electronic device 301 and the second electronic device 303 may have a substantially symmetrical structure, and may include components corresponding to each other. For example, although the first electronic device 301 and the second electronic device 303 shown in FIG. 3 are shown to face each other, and thus, some components are not shown, the first electronic device 301 may include a component of the second electronic device 303 in a portion symmetrical thereto, and the second electronic device 303 may include a component of the first electronic device 301 in a portion symmetrical thereto.

According to various embodiments of the disclosure, the first electronic device 301 and the second electronic device 303 may not be perfectly symmetrical to each other, may be different from each other in at least some components, and may include different components. For example, a battery of the first electronic device 301 and a battery of the second electronic device 303 may have different capacities or different sizes.

An electronic device (e.g., the first electronic device 301 and/or the second electronic device 303) according to an embodiment may be able to be in communication with the external electronic device (not shown). For example, the external electronic device may be one of the mobile devices including a smart phone, a tablet PC, or a smart watch. In an embodiment of the disclosure, the first electronic device 301 and the second electronic device 303 may be in communication with the external electronic device. In addition, the first electronic device 301 and the second electronic device 303 may be in communication with each other. The external electronic device may output a voice received during a call with another electronic device, a sound source stored in the external electronic device or a sound source streamed in real time via a communication network, or a sound generated by playing at least one content. For example, the voice or the sound source may be transmitted to the electronic device 300 and may be output by the electronic device 300.

In an embodiment of the disclosure, the electronic device 300 may be wirelessly connected to the external electronic device. The electronic device 300 may be connected to the external electronic device by wireless communication (e.g., Bluetooth or Bluetooth low energy (BLE)). The electronic device 300 may be connected to the external electronic device via a handsfree profile (HFP) or an advanced audio distribution profile (A2DP). When the electronic device 300 is connected to the external electronic device via the HFP, the external electronic device may be set as an HFP audio gateway (AG), and the electronic device 300 may be set as an HFP handsfree unit (HF). When the electronic device 300 is connected to the external electronic device via the A2DP, the external electronic device may be set as an A2DP source (SRC), and the electronic device 300 may be set as an A2DP sink (SNK). A method of the communication between the electronic device 300 and the external electronic device may not be limited to the wireless connection, and the electronic device 300 may be connected to the external electronic device by wire.

In an embodiment of the disclosure, the first electronic device 301 and the second electronic device 303 may be connected to the external electronic device in different wireless schemes, respectively. For example, the first electronic device 301 may be connected to the external electronic device in a first communication scheme (e.g., the Bluetooth), and the second electronic device 303 may be connected to the external electronic device in the first communication scheme (e.g., the Bluetooth) and/or a second communication scheme (e.g., Zigbee).

In an embodiment of the disclosure, the first electronic device 301 and the second electronic device 303 may be wirelessly connected to each other. The first electronic device 301 may be connected to the second electronic device 303 by the wireless communication (e.g., the Bluetooth or the BLE). For example, the first electronic device 301 may be connected to the second electronic device 303 via the HFP or the A2DP. In this case, the first electronic device 301 may operate as a master device, and the second electronic device 303 may operate as a slave device. However, the disclosure may not be limited thereto, and the second electronic device 303 may operate as the master device and the first electronic device 301 may operate as the slave device. In another embodiment of the disclosure, each of the first electronic device 301 and the second electronic device 303 may operate as the master device. For example, the first electronic device 301 and the second electronic device 303 may operate independently of each other. The first electronic device 301 and the second electronic device 303 may operate independently of the external electronic device. The scheme of the communication between the first electronic device 301 and the second electronic device 303 may not be limited to the wireless connection, and the first electronic device 301 and the second electronic device 303 may be connected to each other by wire.

In an embodiment of the disclosure, the electronic device 300 may receive the audio data related to the voice or the sound source from the external electronic device by being connected to the external electronic device. For example, the first electronic device 301 may receive the audio data using a streaming technique and output the received audio data via the speaker 320. The first electronic device 301 may transmit the received audio data to the second electronic device 303. As another example, the second electronic device 303 may receive the audio data and transmit the received audio data to the first electronic device 301. The electronic device 300 may output a stored sound source to the first electronic device 301 or the second electronic device 303. In this case, the first electronic device 301 and the second electronic device 303 may not be connected to the external electronic device.

In an embodiment of the disclosure, the external electronic device may obtain data (e.g., biometric data) sensed by a wearing detecting sensor included in each of the first electronic device 301 and the second electronic device 303. For example, the external electronic device may obtain data sensed by the first electronic device 301 and data sensed by the second electronic device 303 via the first electronic device 301 or the second electronic device 303. As another example, the external electronic device may obtain the data from each of the first electronic device 301 and the second electronic device 303.

In an embodiment of the disclosure, the external electronic device may control the electronic device 300 or set a state of the electronic device 300 via the communication with the electronic device 300. For example, the external electronic device may control and/or set states of the first electronic device 301 and the second electronic device 303 by transmitting a signal to the first electronic device 301 or the second electronic device 303. In this case, the external electronic device may transmit the signal to the master device (e.g., one of the first electronic device 301 and the second electronic device 303) of the electronic device 300. As another example, the external electronic device may control and/or set the states of the first electronic device 301 and the second electronic device 303 by transmitting the signal to the first electronic device 301 and the second electronic device 303. In this case, each of the first electronic device 301 and the second electronic device 303 may operate as the master device.

In an embodiment of the disclosure, the external electronic device may set one of the first electronic device 301 and the second electronic device 303 as the master device and the other as the slave device based on information sensed by the first electronic device 301 and the second electronic device 303. In addition, the external electronic device may provide a notification to the master device. For example, the notification may be related to a call or a text made (transmitted) and/or taken (received) by the external electronic device. As another example, the notification may be related to an operating state of the electronic device 300.

In an embodiment of the disclosure, the external electronic device may provide information on operating states of the first electronic device 301 and the second electronic device 303 based on the operating state of the electronic device 300 or a user interface for controlling the first electronic device 301 and the second electronic device 303.

According to an embodiment of the disclosure, each pair of the electronic devices 301 and 303 may be in communication with each other or with the external electronic device (e.g., a portable terminal). According to an embodiment of the disclosure, the electronic devices 301 and 303 may operate in association with the external electronic device, or may operate by themselves independently of the external electronic device.

According to an embodiment of the disclosure, the housing may accommodate one or more microphones 311 and 313 (e.g., the input module 150 in FIG. 1 or the at least one microphone 210 in FIG. 2) therein. According to an embodiment of the disclosure, in at least one region of a surface of the housing, a through-hole may be defined such that external sound of each of the electronic devices 301 and 303 may be transmitted to the one or more microphones 311 and 313.

According to an embodiment of the disclosure, the speaker 320 (e.g., the sound output module 155 in FIG. 1 or the speaker 220 in FIG. 2) may convert an electrical signal into a sound, and output the sound to the outside of the electronic devices 301 and 303. For example, the speaker 320 may convert the electrical signal into the sound that the user may audibly recognize and output the sound. According to an embodiment of the disclosure, at least a portion of the speaker 320 may be placed inside the housing.

Although not shown, in an embodiment of the disclosure, the speaker 320 may include a voice coil, a diaphragm, and a magnet. According to an embodiment of the disclosure, the speaker 320 may include a structure (e.g., a wire mesh, a grill, and/or a protector) for preventing an inflow of foreign substances from the outside. According to an embodiment of the disclosure, the structure may be disposed on an outer surface of one region of the housing so as to be visually exposed, and other components (e.g., the voice coil, the diaphragm, or the magnet) of the speaker 320 may be disposed inside the housing.

According to an embodiment of the disclosure, at least one sensor 330 (e.g., the sensor module 176 in FIG. 1 or the at least one sensor 230 in FIG. 2) may be disposed inside the housing. According to various embodiments of the disclosure, the at least one sensor 330 may include at least one of the infrared ray (IR) sensor 330 (not shown), the biometric sensor 330 (not shown), the proximity sensor 330 (not shown), the contact sensor 330 (not shown), the touch (grip) sensor 330 (not shown), the barometric pressure sensor 330 (not shown), the sound wave sensor 330 (not shown), or the motion sensor 330 (not shown).

According to an embodiment of the disclosure, the at least one sensor 330 may be disposed such that at least a portion thereof is exposed to the outside of the electronic devices 301 and 303. According to an embodiment of the disclosure, the electronic devices 301 and 303 may determine a user's state of wearing the electronic devices 301 and 303 based on data measured by the at least one sensor 330. For example, the electronic devices 301 and 303 may sense whether at least a portion of the housing of each of the electronic devices 301 and 303 is in contact with the user's body or a distance between at least the portion of the housing of each of the electronic devices 301 and 303 and the user's body using the at least one sensor 330, and the electronic devices 301 and 303 may recognize the user's state of wearing the electronic devices 301 and 303 based on the sensing of the sensor 330.

According to an embodiment of the disclosure, each of the electronic devices 301 and 303 may include one or more ducts 381 and 383. For example, each of the electronic devices 301 and 303 may include the first duct 381 in one region of the housing directed in a direction opposite to the user's body when worn by the user, and include the second duct 383 in one region of the housing directed in a direction facing the user's body. The one or more ducts 381 and 383, which are structures for ventilation of each of the electronic devices 301 and 303, may be passageways for air, heat, and/or a sound inside each of the electronic devices 301 and 303 to the outside of each of the electronic devices 301 and 303.

According to an embodiment of the disclosure, each of the electronic devices 301 and 303 may include the one or more microphones 311 and 313 (e.g., the input module 150 in FIG. 1 or the at least one microphone 210 in FIG. 2). According to an embodiment of the disclosure, the one or more microphones 311 and 313 may receive (or sense) the external sound of each of the electronic devices 301 and 303. According to an embodiment of the disclosure, each of the electronic devices 301 and 303 may include the first microphone 311 and the second microphone 313. According to an embodiment of the disclosure, the first microphone 311 and the second microphone 313 may be disposed to be spaced apart from each other by a specified spacing.

According to an embodiment of the disclosure, each of the electronic devices 301 and 303 may include a battery 340 (e.g., the battery 189 in FIG. 1). According to an embodiment of the disclosure, the battery 340 may supply power required for an operation of each of the electronic devices 301 and 303 to internal components of each of the electronic devices 301 and 303. According to an embodiment of the disclosure, at least a portion of the housing of each of the electronic devices 301 and 303 may include an outwardly protruding coupling structure 370. According to an embodiment of the disclosure, a charging terminal 375 for receiving the power from an external power supply may be disposed in a portion of the coupling structure 370. In an embodiment of the disclosure, the charging terminal 375 may be electrically connected to the external power supply.

According to an embodiment of the disclosure, each of the electronic devices 301 and 303 may include a fixing member 390 (e.g., a wing tip) that is detachable from the coupling structure 370, and is constructed so as to maintain the state in which each of the electronic devices 301 and 303 is worn in at least the part of the user's body. For example, the fixing member 390 may be made of a material having elasticity. For example, the fixing member 390 may assist each of the electronic devices 301 and 303 to be stably worn in the user's body (e.g., the ear) even when the user's state of wearing each of the electronic devices 301 and 303 is changed (that is, in various wearing states). For example, the housing of each of the electronic devices 301 and 303 may be formed to support the first wearing state and the second wearing state of being worn in the user's body (e.g., the ear), and the fixing member 390 may assist in fixing the state in which each of the electronic devices 301 and 303 is worn in the user's body in the first wearing state and the second wearing state.

According to an embodiment of the disclosure, each of the electronic devices 301 and 303 may include a processor (not shown) (e.g., the processor 120 in FIG. 1 or the processor 250 in FIG. 2). According to an embodiment of the disclosure, the processor may recognize the user's state of wearing each of the electronic devices 301 and 303 based on the one or more microphones 311 and 313, the speaker 320, and the at least one sensor 330. According to an embodiment of the disclosure, the processor may control a function (e.g., activation/deactivation of the noise cancellation function and adjustment of a volume and/or an attribute of the sound output by each of the electronic devices 301 and 303) of each of the electronic devices 301 and 303 based on the user's state of wearing each of the electronic devices 301 and 303.

According to an embodiment of the disclosure, at least one of the first electronic device 301 and the second electronic device 303 may control the functions of the electronic devices 301 and 303 based on the worn state of the first electronic device 301 and/or the worn state of the second electronic device 303. For example, an electronic device (e.g., an electronic device specified as the master device among the first electronic device 301 and the second electronic device 303 or an electronic device currently worn by the user) among the first electronic device 301 and the second electronic device 303 may specifically adjust a function of the electronic device 300 based on a worn state of the other electronic device (e.g., an electronic device specified as the slave device among the first electronic device 301 and the second electronic device 303 or an electronic device not currently worn by the user). For example, the first electronic device 301 may recognize whether the second electronic device 303 is worn in the first wearing state, is worn in the second wearing state, or is not worn. For example, the first electronic device 301 may receive data related to the worn state of the second electronic device 303 from the second electronic device 303 or the external electronic device. For example, the first electronic device 301 may adjust the volume of the sound output via the speaker, adjust the settings of the noise cancellation function, or adjust the setting value of the equalizer based on the worn state of the first electronic device 301 and/or the worn state of the second electronic device 303. As another example, the second electronic device 303 may recognize the worn state of the first electronic device 301, and adjust the volume of the sound output via the speaker, adjust the settings of the noise cancellation function, or adjust the setting value of the equalizer based on the worn state of the second electronic device 303 and/or the worn state of the first electronic device 301. According to various embodiments of the disclosure, the first electronic device 301 and/or the second electronic device 303 may differently adjust the function of the first electronic device 301 and/or the function of the second electronic device 303 based on the worn state of the first electronic device 301 and/or the worn state of the second electronic device 303. For example, based on the worn states of the first electronic device 301 and/or the second electronic device 303, the noise cancellation function of the first electronic device 301 and/or the second electronic device 303 may be activated or deactivated independently of each other. For example, based on the worn states of the first electronic device 301 and/or the second electronic device 303, the volumes of the sounds output from the first electronic device 301 and/or the second electronic device 303, detailed settings of the noise cancellation functions, and/or the settings of the equalizers may be set differently from each other.

According to various embodiments of the disclosure, the operation of recognizing the worn states of the respective electronic devices and more specifically controlling the functions of the electronic devices 301 and 303 based on the worn states may be performed by the electronic device pre-specified as the master, a device specified by the user, or the electronic device currently worn by the user among the first electronic device 301 and the second electronic device 303.

According to various embodiments of the disclosure, the electronic devices 301 and 303 shown in FIG. 3 are illustrative, so that the disclosure may not be limited thereto, and at least some of the components of the electronic devices 301 and 303 may be omitted or replaced.

Figure 4A:
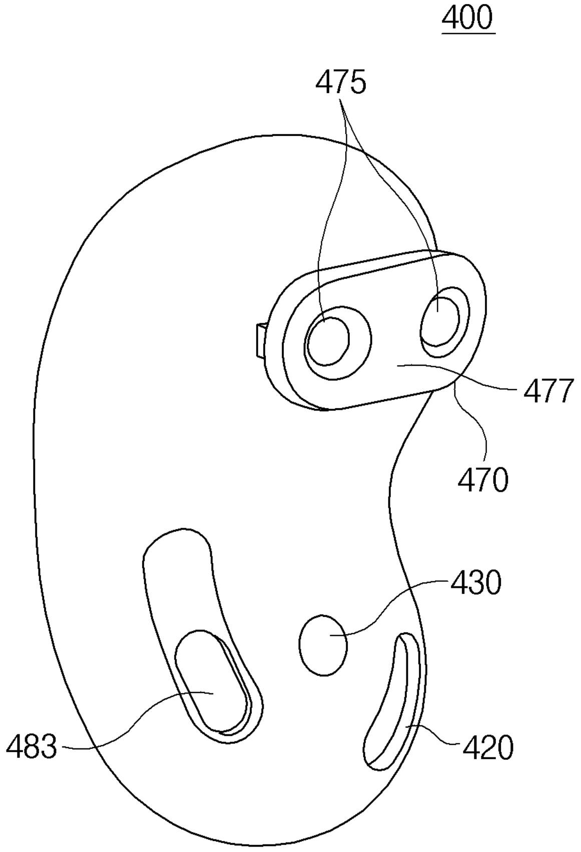
FIGS. 4A, 4B, and 4C are perspective views of an electronic device according to various embodiments of the disclosure.
Figure 4B:
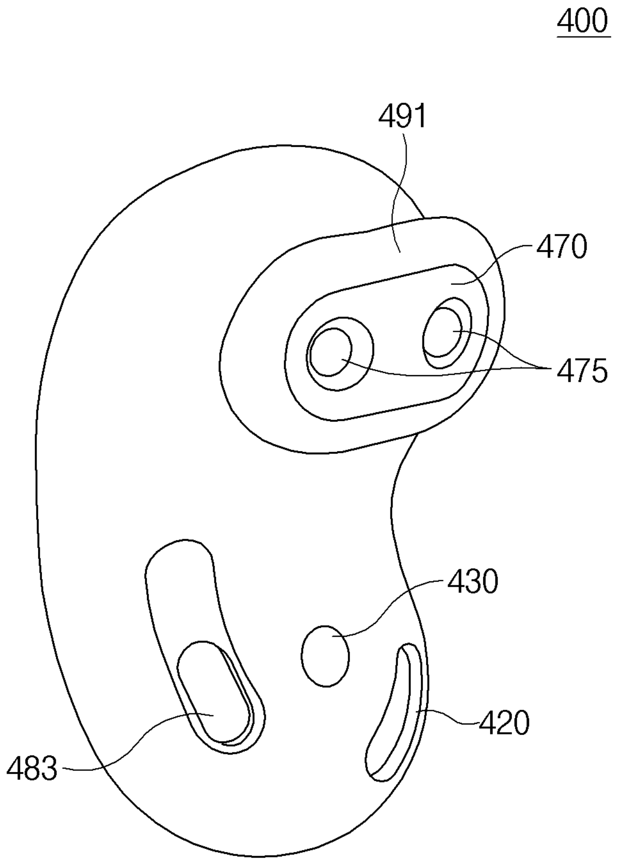
Figure 4C:
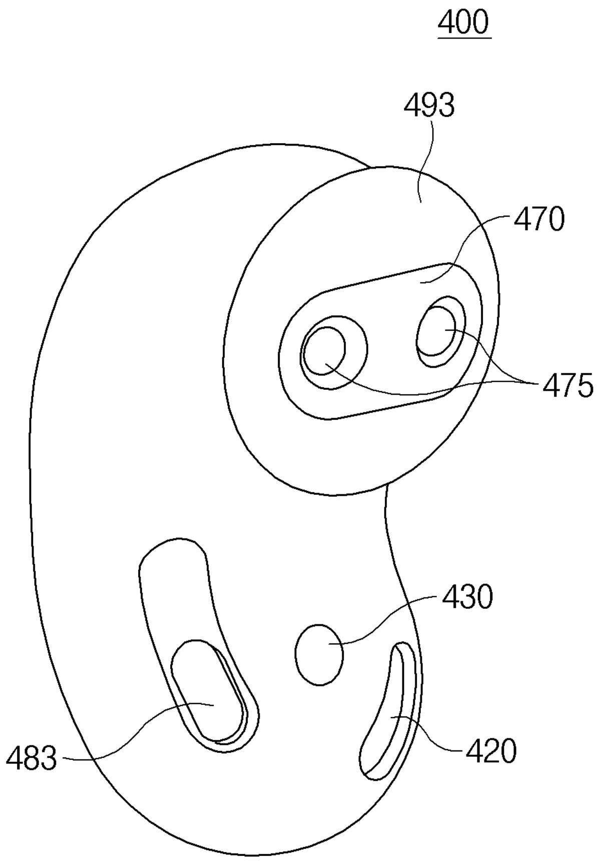

FIGS. 4A, 4B, and 4C are perspective views of an electronic device 400 (e.g., the electronic device 101 in FIG. 1, the electronic device 200 in FIG. 2, and/or the electronic devices 301 and 303 in FIG. 3) according to various embodiments of the disclosure. For example, FIG. 4A shows a state before a housing (e.g., the coupling structure 370 in FIG. 3) of an electronic device and fixing members 491 and 493 (e.g., the fixing member 390 in FIG. 3) are coupled to each other, and FIGS. 4B and 4C show states in which the fixing members 491 and 493 having different sizes are coupled to the housing. Hereinafter, descriptions corresponding to those of FIG. 3 will be omitted or briefly described.

Referring to FIGS. 4A, 4B, and 4C, the electronic device 400 according to an embodiment may include at least one microphone (e.g., the input module 150 in FIG. 1, the at least one microphone 210 in FIG. 2, or the microphones 311 and 313 in FIG. 3), a speaker 420 (e.g., the sound output module 155 in FIG. 1, the speaker 220 in FIG. 2, or the speaker 320 in FIG. 3), and at least one sensor 430 (e.g., the sensor module 176 in FIG. 1, the at least one sensor 230 in FIG. 2, or the sensor 330 in FIG. 3). According to an embodiment of the disclosure, a housing of the electronic device 400 may be formed to be inserted into at least the part (e.g., the ear) of the user's body. For example, when the electronic device 400 is worn, the speaker 420 of the electronic device 400 may output a sound toward the user's ear.

According to an embodiment of the disclosure, the at least one microphone may be placed on a portion of the housing on a side opposite to a side on which the speaker 420 is placed.

According to an embodiment of the disclosure, when the user is wearing the electronic device 400, the at least one sensor 430 may sense a distance between the electronic device 400 and the user and whether the electronic device 400 and the user are in contact with each other.

According to an embodiment of the disclosure, a duct 483 (e.g., the ducts 381 and 383 in FIG. 3) of the electronic device 400 may form a passageway through which air passes between the inside and the outside of the electronic device 400.

According to an embodiment of the disclosure, a portion of the housing of the electronic device 400 may include an outwardly protruding coupling structure 470 (e.g., the coupling structure 370 in FIG. 3). For example, a charging terminal 475 (e.g., the charging terminal 375 in FIG. 3) for charging a battery (not shown) (e.g., the battery 189 in FIG. 1 or the battery 340 in FIG. 3) of the electronic device 400 may be disposed in the coupling structure 470. According to an embodiment of the disclosure, the charging terminal 475 may include a plurality of terminals. According to an embodiment of the disclosure, a magnet 477 may be disposed at a center of the coupling structure 470. For example, the magnet 477 may be disposed inside the coupling structure 470 and may not be visually recognized from the outside of the electronic device 400. According to an embodiment of the disclosure, the magnet 477 may magnetically couple the electronic device 400 and the external electronic device to each other when the electronic device 400 is mounted in the external electronic device (e.g., a charging casing).

Referring to FIGS. 4B and 4C, the fixing members 491 and 493 may be detached from the coupling structure 470 of the electronic device 400. According to an embodiment of the disclosure, at least a portion of each of the fixing members 491 and 493 may be formed to have elasticity so as to be deformed, and the electronic device 400 may be constructed to maintain a state of being worn in at least the part of the user's body. For example, the fixing members 491 and 493 may be made of a silicon material. According to an embodiment of the disclosure, an opening may be defined at a center of each of the fixing members 491 and 493 such that the coupling structure 470 of the housing may be coupled thereto. For example, each of the fixing members 491 and 493 may be made of a material having elasticity and may be coupled so as to surround the coupling structure 470. According to an embodiment of the disclosure, a central portion (e.g., a portion around the opening) of each of the fixing members 491 and 493 may be formed to be relatively less elastic than an edge portion of each of the fixing members 491 and 493. For example, the central portion of each of the fixing members 491 and 493 may be less elastic and may be formed to maintain the coupling between the electronic device 400 and each of the fixing members 491 and 493 when being coupled to the coupling structure 470, and the edge portion of each of the fixing members 491 and 493 may be formed to have elasticity and to be easily deformed corresponding to the user's body when being in contact with the user's body.

According to various embodiments of the disclosure, the fixing members 491 and 493 may have different shapes and/or sizes. For example, the fixing member 491 in FIG. 4B may have an overall elliptical shape and may have a smaller size than the fixing member 493 in FIG. 4C. For example, the fixing member 493 in FIG. 4C may have an overall circular shape and may have a larger size than the fixing member 491 in FIG. 4B. For example, because the fixing members 491 and 493 of the different shapes or sizes may be provided, depending on the user, the fixing members 491 and 493 that may keep the worn state of the electronic device 400 fixed when the electronic device 400 is worn may be selectively coupled to the electronic device 400.

Figure 5:
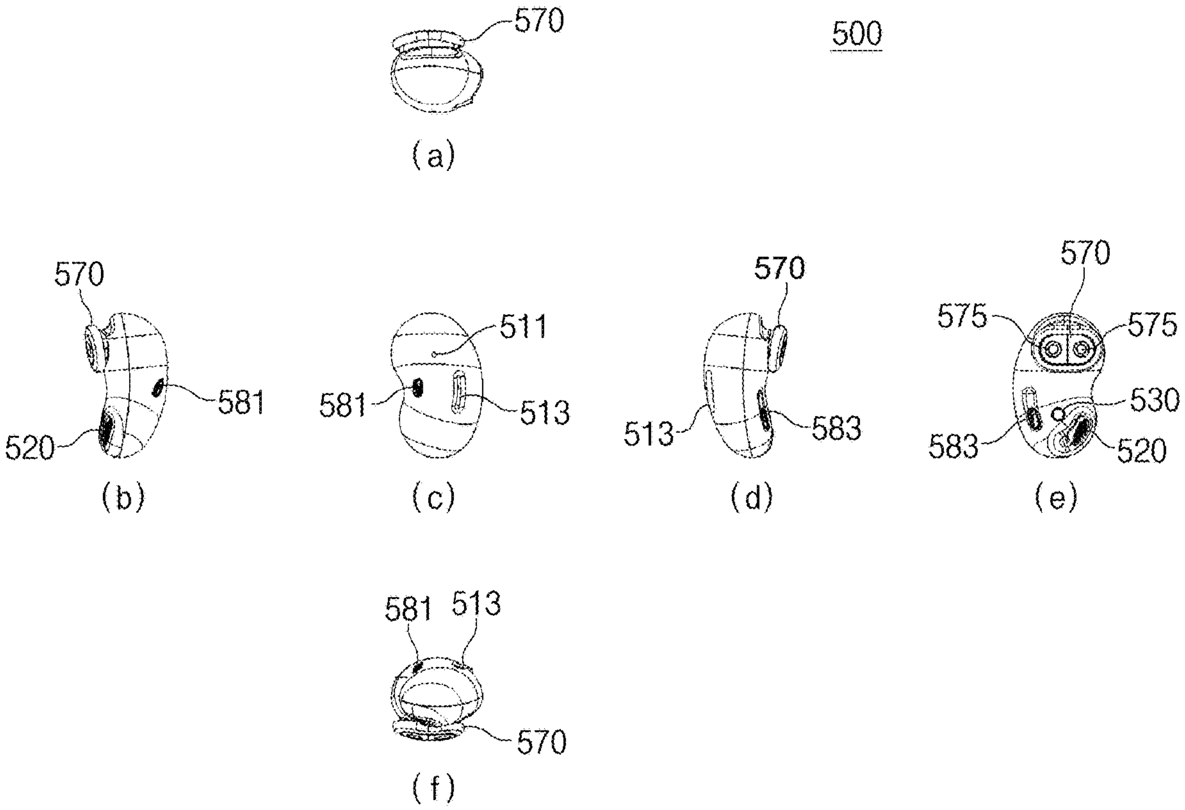
FIG. 5 is a diagram showing an electronic device according to an embodiment of the disclosure.

FIG. 5 is a diagram showing an electronic device 500 (e.g., the electronic device 101 in FIG. 1, the electronic device 200 in FIG. 2, the electronic devices 301 and 303 in FIG. 3, or the electronic device 400 in FIGS. 4A, 4B, and 4C) according to an embodiment of the disclosure. For example, (a) in FIG. 5 is a top view, (b) is a right view, (c) is a front view, (d) is a left view, (e) is a back view, and (f) is a bottom view of the electronic device 500. Hereinafter, the features described with reference to FIGS. 3 and 4A, 4B, and 4C will be briefly described or omitted.

According to an embodiment of the disclosure, a portion of a housing of the electronic device 500 may include a coupling structure 570 (e.g., the coupling structure 370 in FIG. 3 or the coupling structure 470 in FIGS. 4A, 4B, and 4C) protruding toward the outside (e.g., in a rearward direction). According to an embodiment of the disclosure, a fixing member (e.g., the wing tip) (e.g., the fixing member 390 in FIG. 3 and the fixing members 491 in FIG. 4B and 493 in FIG. 4C) that assists in maintaining a worn state when being worn in the user's body may be detached from the coupling structure 570.

According to an embodiment of the disclosure, a first duct 581, a first microphone 511 (e.g., the first microphone 311 in FIG. 3), and a second microphone 513 (e.g., the second microphone 313 in FIG. 3) may be disposed in a rear portion of the housing of the electronic device 500. According to an embodiment of the disclosure, the coupling structure 570, a second duct 583 (e.g., the second duct 383 in FIG. 3 and the duct 483 in FIGS. 4A, 4B, and 4C), at least one sensor 530 (e.g., the sensor module 176 in FIG. 1, the at least one sensor 230 in FIG. 2, the sensor 330 in FIG. 3, or the sensor 430 in FIGS. 4A, 4B, and 4C), and a speaker 520 (e.g., the sound output module 155 in FIG. 1, the speaker 220 in FIG. 2, the speaker 320 in FIG. 3, or the speaker 420 in FIGS. 4A, 4B, and 4C) may be disposed in a front portion of the electronic device 500. According to an embodiment of the disclosure, the coupling structure 570 may include at least one charging terminal 575 (e.g., the charging terminal 375 in FIG. 3 or the charging terminal 475 in FIGS. 4A, 4B, and 4C).

According to an embodiment of the disclosure, another electronic device 500 that is paired with the electronic device 500 shown in FIG. 5 may have a structure symmetrical to that shown in FIG. 5. According to various embodiments of the disclosure, the diagram shown in FIG. 5 is an example, and arrangement of the components of the electronic device 500 may be changed or omitted.

Figure 6A:
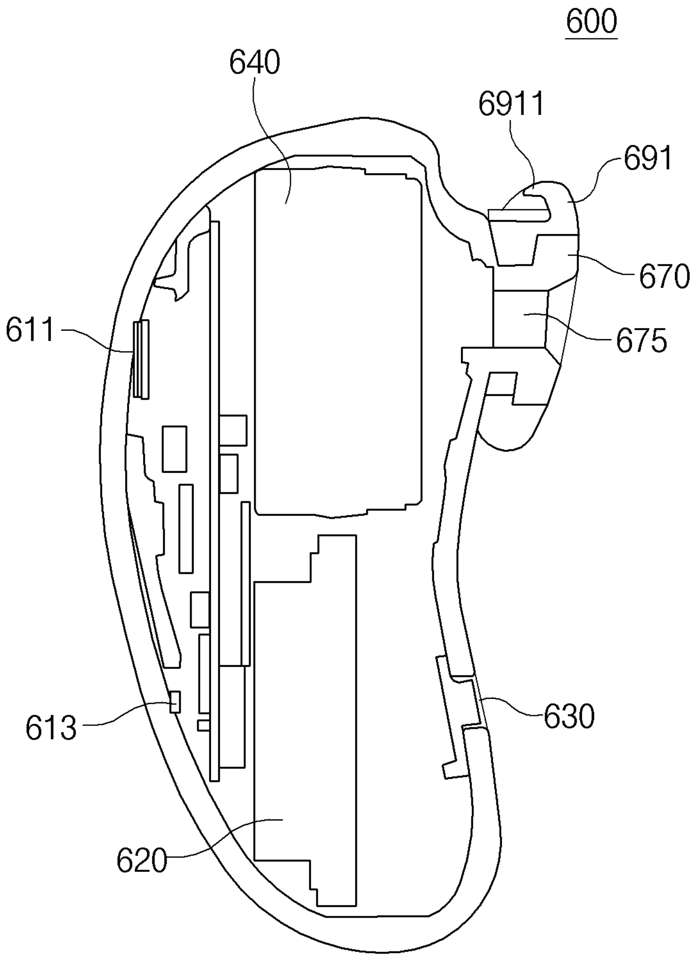
FIGS. 6A and 6B are cross-sectional views of an electronic device according to various embodiments of the disclosure.
Figure 6B:
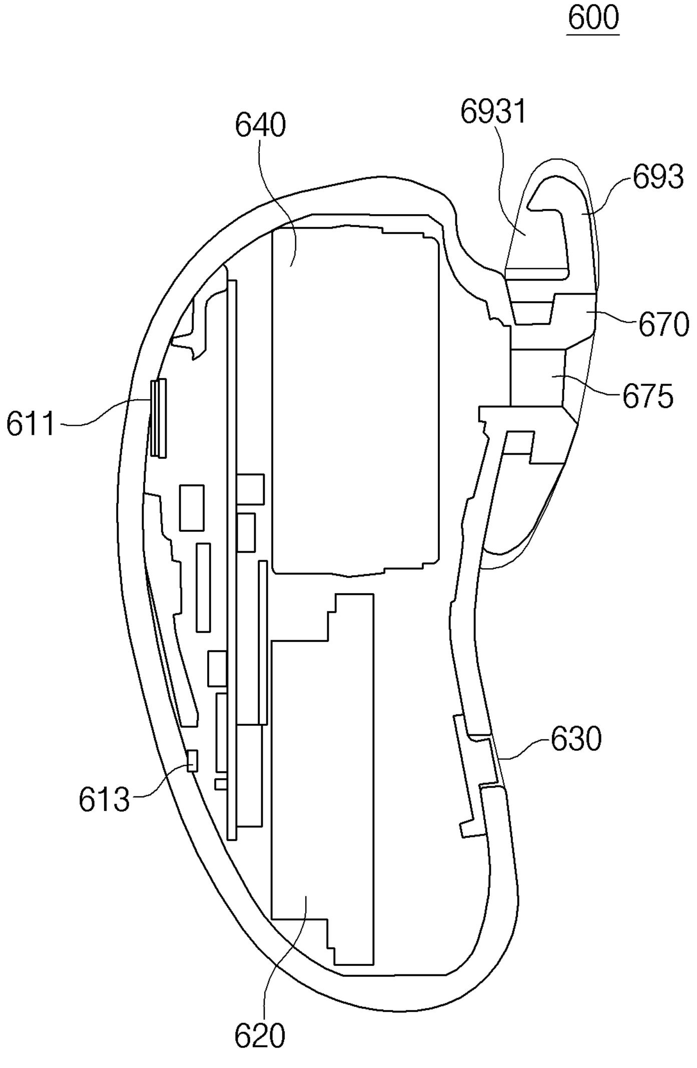

FIGS. 6A and 6B are cross-sectional views of an electronic device 600 (e.g., the electronic device 101 in FIG. 1, the electronic device 200 in FIG. 2, the electronic devices 301 and 303 in FIG. 3, the electronic device 400 in FIGS. 4A, 4B, and 4C, or the electronic device 500 in FIG. 5) according to various embodiments of the disclosure. For example, FIGS. 6A and 6B respectively show cross-sections in cases in which fixing members 691 and 693 (e.g., the fixing member 390 in FIG. 3 and the fixing members 491 in FIG. 4B and 493 in FIG. 4C) of different sizes are coupled to a coupling structure 670 (e.g., the coupling structure 370 in FIG. 3, the coupling structure 470 in FIGS. 4A, 4B, and 4C, or the coupling structure 570 in FIG. 5) of an electronic device 600. For example, FIG. 6A may correspond to the electronic device 600 shown in FIGS. 4B and 6B may correspond to the electronic device 600 shown in FIG. 4C.

According to an embodiment of the disclosure, the electronic device 600 may include a housing, a battery 640 (e.g., the battery 189 in FIG. 1, the battery 340 in FIG. 3, or the battery 440 in FIGS. 4A, 4B, and 4C), a speaker 620 (e.g., the sound output module 155 in FIG. 1, the speaker 220 in FIG. 2, the speaker 320 in FIG. 3, the speaker 420 in FIGS. 4A, 4B, and 4C, or the speaker 520 in FIG. 5), a first microphone 611 (e.g., the first microphone 311 in FIG. 3 or the first microphone 511 in FIG. 5), a second microphone 613 (e.g., the second microphone 313 in FIG. 3 or the second microphone 513), and a sensor 630 (e.g., the sensor module 176 in FIG. 1, the at least one sensor 230 in FIG. 2, the sensor 330 in FIG. 3, the sensor 430 in FIGS. 4A, 4B, and 4C, or the sensor 530 in FIG. 5). According to an embodiment of the disclosure, at least a portion of the housing may include the outwardly protruding coupling structure 670 (e.g., the coupling structure 370 in FIG. 3, the coupling structure 470 in FIGS. 4A, 4B, and 4C, or the coupling structure 570 in FIG. 5). According to an embodiment of the disclosure, the coupling structure 670 may include a charging terminal 675 (e.g., the charging terminal 375 in FIG. 3, the charging terminal 475 in FIGS. 4A, 4B, and 4C, or the charging terminal 575 in FIG. 5). According to an embodiment of the disclosure, the electronic device 600 may receive the power from the external power supply via the charging terminal 675 and charge the battery 640 using the received power.

According to an embodiment of the disclosure, the fixing members 691 and 693 that assist in maintaining a worn state of the electronic device 600 when the user is wearing the electronic device 600 may be detached from the coupling structure 670. According to an embodiment of the disclosure, the fixing members 691 and 693 (e.g., the fixing member 390 in FIG. 3 or the fixing members 491 in FIG. 4B and 493 in FIG. 4C) may be formed of the material having the elasticity. According to an embodiment of the disclosure, at least a portion of each of the fixing members 691 and 693 may include each of empty spaces 6911 and 6931 defined so as to facilitate deformation of the portion of each of the fixing members. For example, the empty spaces 6911 and 6931 may be spaces defined such that edge portions of the fixing members 691 and 693 may be pressed inward with the elasticity by an external pressure. According to various embodiments of the disclosure, the fixing members 691 and 693 may have various shapes or sizes. For example, the fixing member 691 may have a different shape or size than the fixing member 693.

According to an embodiment of the disclosure, the sensor 630 of the electronic device 600 may sense a distance between the electronic device 600 and the user or whether the electronic device 600 and the user are in contact with each other.

According to an embodiment of the disclosure, the first microphone 611 and the second microphone 613 may receive or sense a sound outside the electronic device 600. According to an embodiment of the disclosure, the first microphone 611 and the second microphone 613 may be disposed to be spaced apart from each other by a specified spacing.

According to an embodiment of the disclosure, a portion of the housing of the electronic device 600 may include a structure for a sound output from the speaker 620 to be output to the outside. For example, the structure may include a passageway through which the sound output from the speaker 620 is directed toward the user's body (e.g., the ear) when the user is wearing the electronic device 600.

According to an embodiment of the disclosure, inside the housing of the electronic device 600, a circuit board on which the components (e.g., the first microphone 611, the second microphone 613, the sensor 630, the speaker 620, the battery 640, a communication circuit (not shown), and/or a processor (not shown)) of the electronic device 600 are mounted or an electrically connected to each other may be disposed. According to various embodiments of the disclosure, the components included in the electronic device 600 may not be limited to those shown in FIGS. 6A and 6B and may be added or omitted, and an arrangement of each component may be changed.

Figure 7:
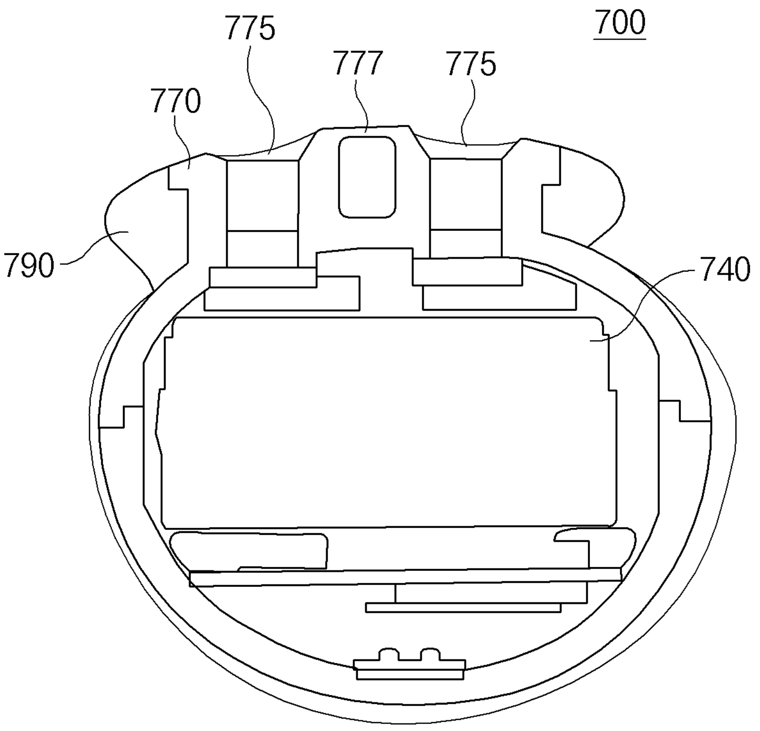
FIG. 7 is a cross-sectional view of an electronic device according to an embodiment of the disclosure.

FIG. 7 is a cross-sectional view of an electronic device 700 (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, or the electronic device 600 in FIGS. 6A and 6B) according to an embodiment of the disclosure. Hereinafter, the contents described with reference to FIGS. 6A and 6B will be briefly described or omitted.

According to an embodiment of the disclosure, a portion of a housing of the electronic device 700 may include an outwardly protruding coupling structure 770 (e.g., the coupling structure 370 in FIG. 3, the coupling structure 470 in FIGS. 4A, 4B, and 4C, the coupling structure 570 in FIG. 5, or the coupling structure 670 in FIGS. 6A and 6B) and a battery 740 (e.g., the battery 189 in FIG. 1, the battery 340 in FIG. 3, the battery 440 in FIGS. 4A, 4B, and 4C, or the battery 640 in FIGS. 6A and 6B). According to an embodiment of the disclosure, at least one charging terminal 775 (e.g., the charging terminal 375 in FIG. 3, the charging terminal 475 in FIGS. 4A, 4B, and 4C, the charging terminal 575 in FIG. 5, or the charging terminal 675 in FIGS. 6A and 6B) for supplying the power to the battery 740 may be included inside the coupling structure 770. For example, the electronic device 700 may receive the power from the external power supply via the charging terminal 775 and charge the battery 740 using the received power. According to an embodiment of the disclosure, the coupling structure 770 may include a magnet 777 (e.g., the magnet 477 in FIG. 4A). According to an embodiment of the disclosure, the magnet 777 may be magnetically coupled to the external electronic device (e.g., a charging casing of the electronic device 700). For example, the magnet 777 may establish coupling between the electronic device 700 and the external electronic device when the electronic device 700 is inserted into the external electronic device. According to an embodiment of the disclosure, a fixing member 790 (e.g., the fixing member 390 in FIG. 3, the fixing members 491 in FIG. 4B and 493 in FIG. 4C, or the fixing members 691 in FIG. 6A and 693 in FIG. 6B) that assists in maintaining a worn state of the electronic device 700 may be coupled to the coupling structure 770.

Figure 8A:
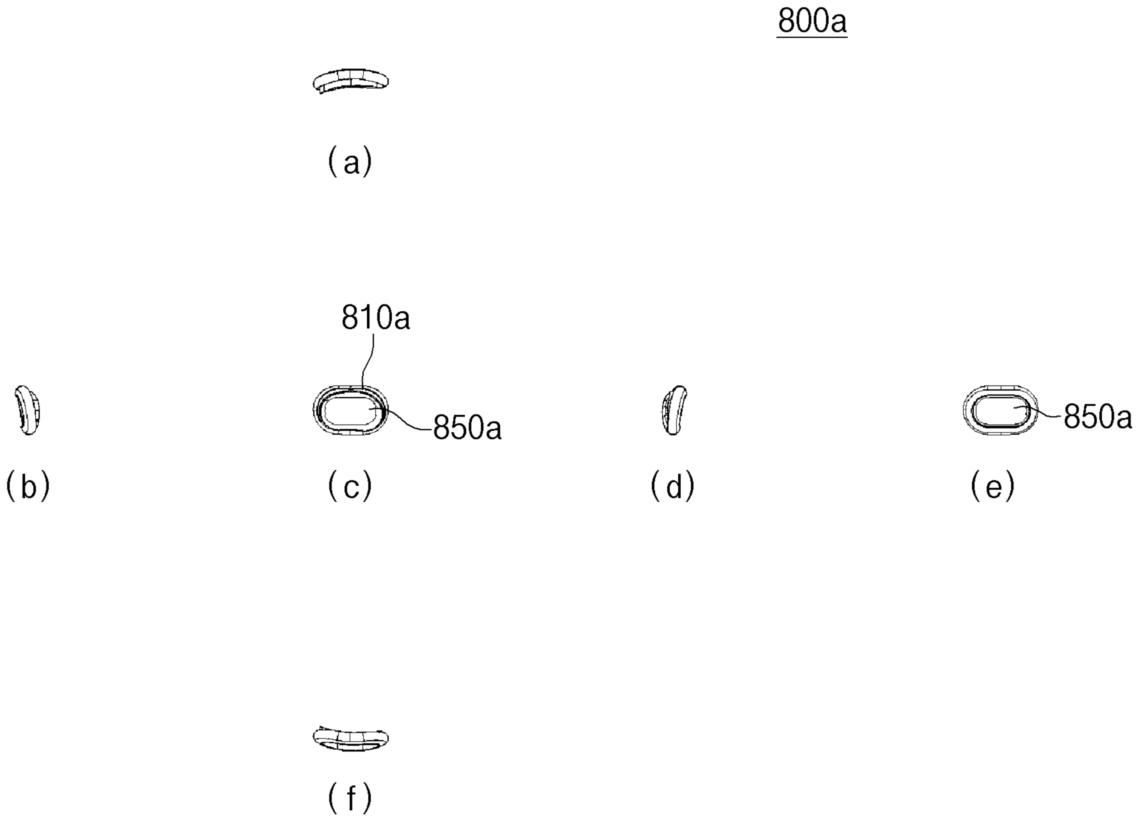
FIGS. 8A and 8B are diagrams showing a fixing member of an electronic device according to various embodiments of the disclosure.
Figure 8B:
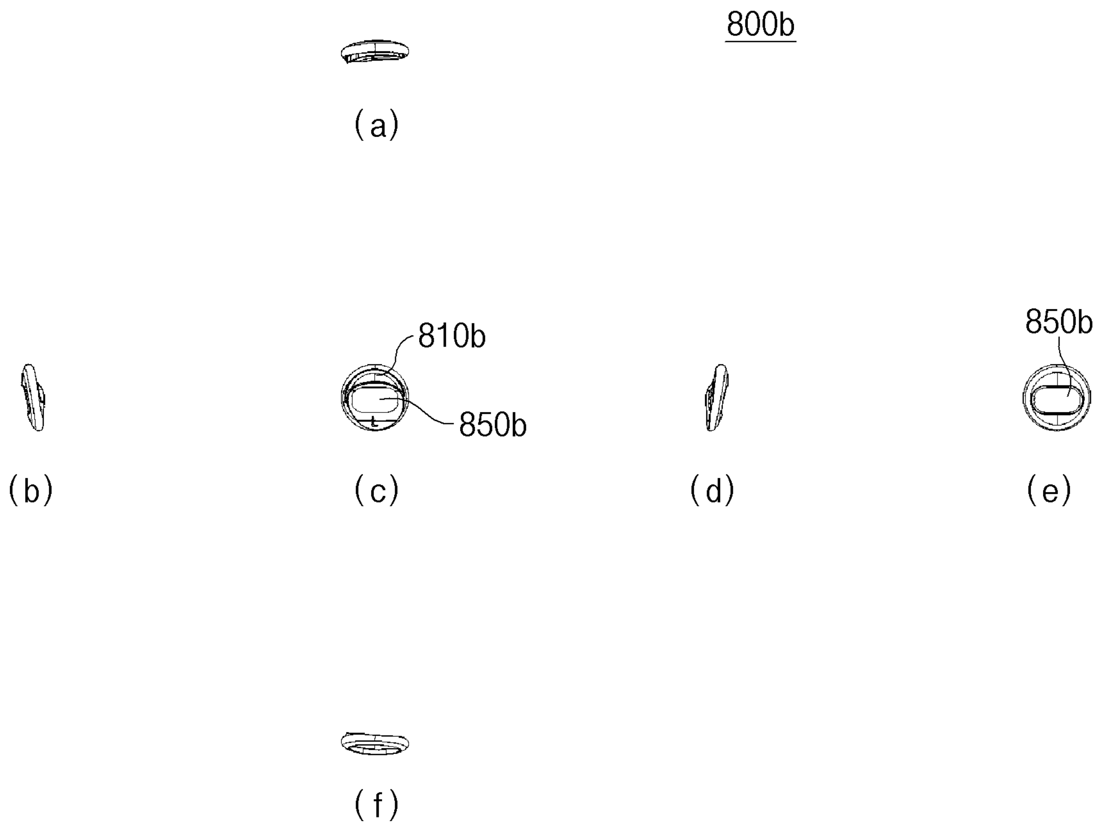

FIGS. 8A and 8B are diagrams showing fixing members 800*a* and 800*b* (e.g., the fixing member 390 in FIG. 3, the fixing members 491 in FIG. 4B and 493 in FIG. 4C, the fixing members 691 in FIG. 6A and 693 in FIG. 6B, or the fixing member 790 in FIG. 7) of an electronic device (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, the electronic device 600 in FIGS. 6A and 6B, or the electronic device 700 in FIG. 7) according to various embodiments of the disclosure. For example, (a) in each of FIGS. 8A and 8B is a top view, (b) is a right view, (c) is a front view, (d) is a left view, (e) is a back view, and (f) is a bottom view of each of the fixing members 800*a* and 800*b*.

According to various embodiments of the disclosure, the fixing members 800*a* and 800*b* may have various shapes or sizes. For example, the fixing member 800*a* in FIG. 8A may have an elliptical shape and may have a smaller size than the fixing member 800*b* in FIG. 8B. For example, the fixing member 800*b* in FIG. 8B may have a circular shape. For example, the fixing member 800*a* in FIG. 8A may correspond to the fixing members 493 and 691 of the electronic devices 400 and 600 shown in FIGS. 4B and 6A, and the fixing member 800*b* in FIG. 8B may correspond to the fixing members 493 and 693 of the electronic devices 400 and 600 shown in FIGS. 4C and 6B. Hereinafter, the features described with reference to FIGS. 3, 4A, 4B, and 4C, 5, 6A, 6B, and 7 will be briefly described or omitted.

According to an embodiment of the disclosure, the fixing members 800*a* and 800*b* may be in close contact with the user's ear to fix the worn state of the electronic device when the electronic device is worn in the user's body (e.g., the ear). According to an embodiment of the disclosure, the fixing members 800*a* and 800*b* may be made of flexible materials. For example, at least a portion of each of the fixing members 800*a* and 800*b* may have the elasticity. According to an embodiment of the disclosure, each of openings 850*a* and 850*b* to be coupled with a coupling structure of a housing of the electronic device may be defined at a center of each of the fixing members 800*a* and 800*b*. According to an embodiment of the disclosure, at least a portion of each of the fixing members 800*a* and 800*b* may have each of spaces 810*a* and 810*b* (e.g., an air pocket) defined such that at least a portion of each of the fixing members 800*a* and 800*b* may be deformed with the elasticity. Hereinafter, the spaces will be described in more detail with reference to FIGS. 9A and 9B.

Figure 9A:
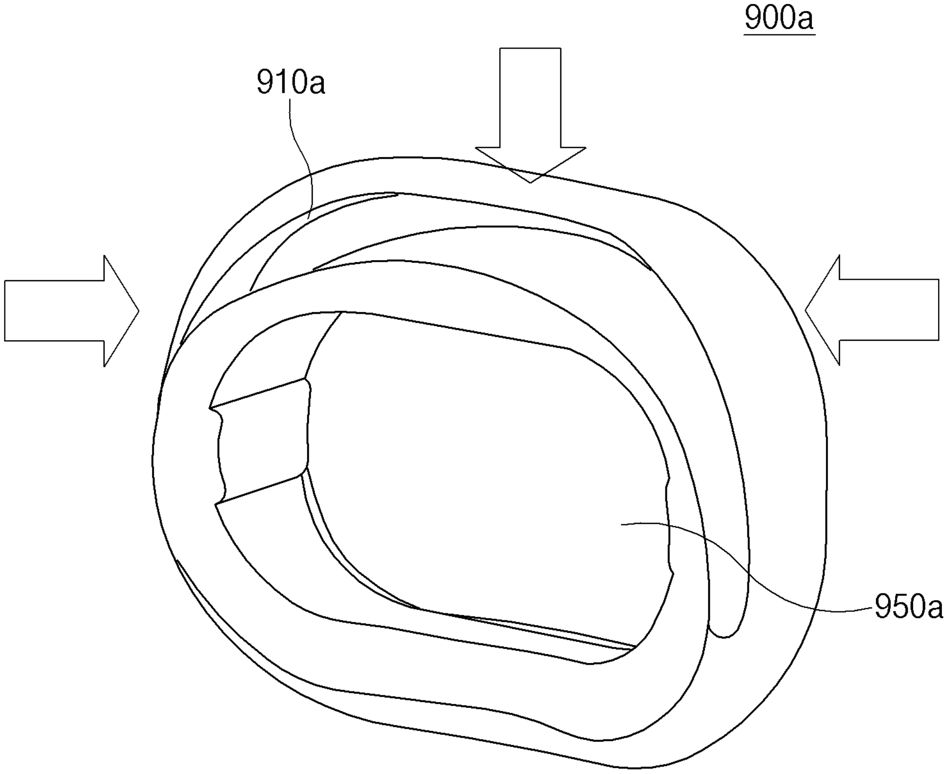
FIGS. 9A and 9B are perspective views of a fixing member of an electronic device according to various embodiments of the disclosure.
Figure 9B:
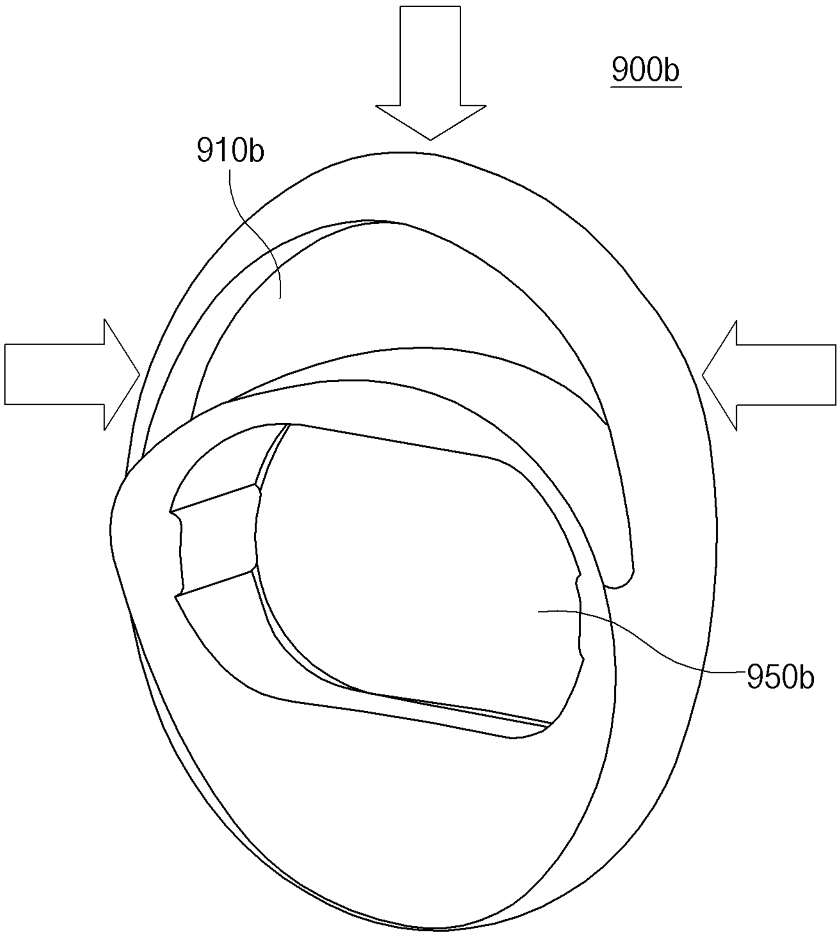

FIGS. 9A and 9B are diagrams showing fixing members 900*a* and 900*b* (e.g., the fixing member 390 in FIG. 3, the fixing members 491 in FIG. 4B and 493 in FIG. 4C, the fixing members 691 in FIG. 6A and 693 in FIG. 6B, the fixing member 790 in FIG. 7, and the fixing members 800*a* in FIG. 8A and 800*b* in FIG. 8B) according to various embodiments of the disclosure. For example, FIGS. 9A and 9B show examples of the fixing members 900*a* and 900*b* having different shapes and sizes. For example, the fixing member 900*a* in FIG. 9A may correspond to the fixing member 800*a* shown in FIG. 8A, and the fixing member 900*b* in FIG. 9B may correspond to the fixing member 800*b* in FIG. 8B. Hereinafter, the contents described with reference to FIGS. 8A and 8B will be briefly described or omitted.

According to an embodiment of the disclosure, the fixing members 900*a* and 900*b* may be in close contact with the user's ear to fix the worn state of the electronic device when the electronic device (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, the electronic device 600 in FIGS. 6A and 6B, or the electronic device 700 in FIG. 7) is worn in the user's body (e.g., the ear). According to an embodiment of the disclosure, the fixing members 900*a* and 900*b* may be made of flexible materials. For example, at least a portion of each of the fixing members 900*a* and 900*b* may have the elasticity. According to an embodiment of the disclosure, each of openings 950*a* and 950*b* (e.g., the openings 850*a* in FIG. 8A and 850*b* in FIG. 8B) to be coupled with a coupling structure of a housing of the electronic device may be defined at a center of each of the fixing members 900*a* and 900*b*. According to an embodiment of the disclosure, at least a portion of each of the fixing members 900*a* and 900*b* may have each of spaces 910*a* and 910*b* (e.g., the spaces 810*a* in FIG. 8A and 810*b* in FIG. 8B) defined such that at least a portion of each of the fixing members 900*a* and 900*b* may be deformed with the elasticity. For example, when each of the fixing members 900*a* and 900*b* receives a pressure in directions of arrows from the outside, a portion of each of the fixing members 900*a* and 900*b* that is received the pressure in a direction inwardly of the space may be recessed in a direction of each of the openings 950*a* and 950*b*. For example, because of the space, the portion of each of the fixing members 900*a* and 900*b* may be easily deformed so as to correspond to the user's body when in contact with the user's body (e.g., the ear), and become more comfortable for the user. According to an embodiment of the disclosure, portions around the openings 950*a* and 950*b* of the fixing members 900*a* and 900*b* may be formed to be relatively less elastic than edge portions (e.g., the portions subjected to the external pressure) of the fixing members 900*a* and 900*b*. For example, the portions around the openings 950*a* and 950*b* of the fixing members 900*a* and 900*b* may be relatively less elastic such that the fixing members 900*a* and 900*b* are not easily separated from the electronic device when being coupled to the coupling structure of the housing of the electronic device, and the edge portions of the fixing members 900*a* and 900*b* may be formed to have great elasticity so as to be easily deformed corresponding to the user's body.

Figure 10A:
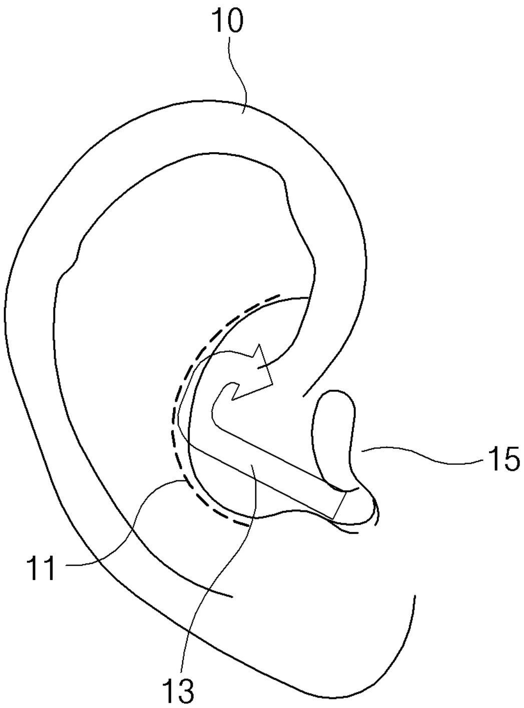
FIGS. 10A, 10B, and 10C are diagrams for illustrating an operation of an electronic device according to various embodiments of the disclosure.
Figure 10B:
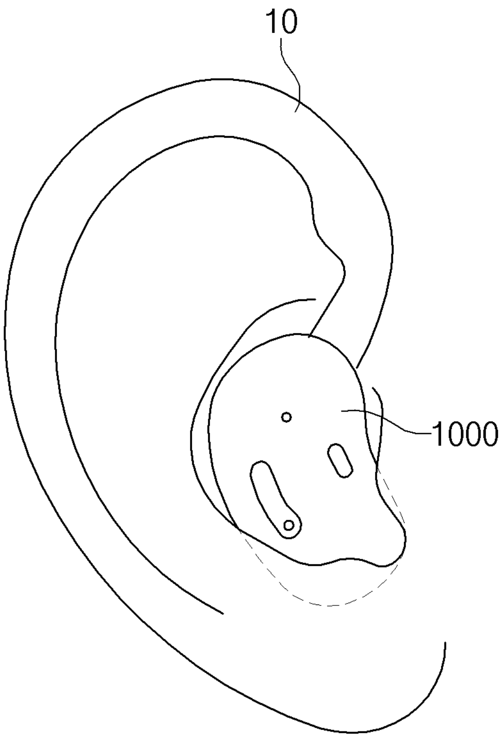
Figure 10C:
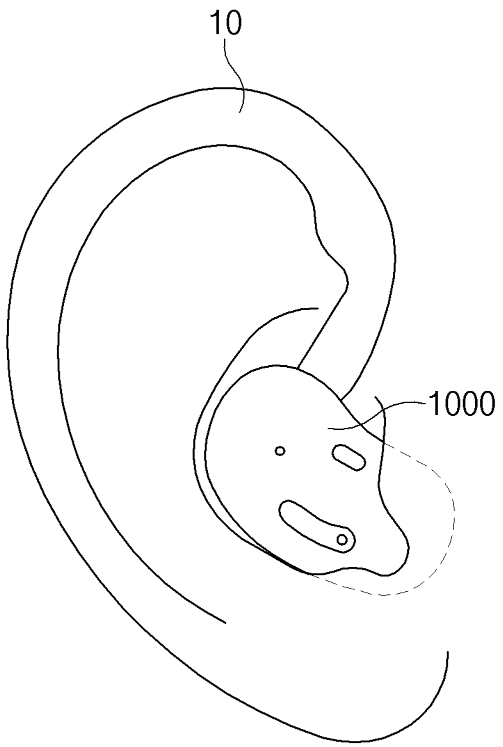

FIGS. 10A, 10B, and 10C are diagrams for illustrating an operation of an electronic device 1000 (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, the electronic device 600 in FIGS. 6A and 6B, or the electronic device 700 in FIG. 7) according to various embodiments of the disclosure.

Referring to FIG. 10A, the user's ear may include an antihelix 11, a concha 13, and a tragus 15. For example, the sound entering the user's ear may be transmitted in a direction of an external auditory meatus (not shown) via the tragus 15.

FIG. 10B shows a first wearing state of the electronic device 1000 according to an embodiment. For example, the electronic device 1000 may be worn in a user's ear 10 such that a portion of a speaker (e.g., the sound output module 155 in FIG. 1, the speaker 220 in FIG. 2, the speaker 320 in FIG. 3, the speaker 420 in FIGS. 4A, 4B, and 4C, or the speaker 520 in FIG. 5) is positioned inside the tragus 15 of the user's ear 10 (e.g., in a direction of the external auditory meatus). According to an embodiment of the disclosure, the electronic device 1000 may be worn such that a housing (a body) of the electronic device 1000 is disposed on the concha 13 of the user while a portion (e.g., a fixing member (e.g., the wing tip) of the electronic device 1000) of the electronic device 1000 is hung near the antihelix 11 of the user's ear 10. According to various embodiments of the disclosure, a shape of the ear may be different for each user, and the electronic device 1000 may be in close contact with, placed on, and/or worn on a part of the ear that is at least partially different from the above example depending on the shape of the user's ear. For example, when the user is wearing the electronic device 1000, at least one microphone (e.g., the input module 150 in FIG. 1, the at least one microphone 210 in FIG. 2, the microphones 311 and 313 in FIG. 3, the microphones 511 and 513 in FIG. 5, or the microphones 611 and 613 in FIGS. 6A and 6B) of the electronic device 1000 may be exposed in a direction outwardly of the user, and portions of the speaker and at least one sensor (e.g., the sensor module 176 in FIG. 1, the at least one sensor 230 in FIG. 2, the sensor 330 in FIG. 3, the sensor 430 in FIGS. 4A, 4B, and 4C, the sensor 530 in FIG. 5, and the sensor 630 in FIGS. 6A and 6B) may be disposed to face the inside of the user's ear 10. According to an embodiment of the disclosure, the first wearing state may be a state in which the electronic device 1000 is inserted less into the tragus of the user's ear 10 compared to a second wearing state. For example, in the first wearing state, the electronic device 1000 may operate as an open audio output device (e.g., the earphone). For example, in the first wearing state, the electronic device 1000 may be less closely in contact with the user's ear 10 than in the second wearing state. For example, in the first wearing state, more external sound may enter the user's ear 10 together with a sound output from the electronic device 1000 (e.g., the speaker).

FIG. 10C shows the second wearing state of the electronic device 1000 according to an embodiment. According to an embodiment of the disclosure, the second wearing state may be a state in which the electronic device 1000 is inserted more into the tragus of the user's ear 10 compared to the first wearing state. For example, the electronic device 1000 may be further inserted into the user's ear 10 while at least partially rotating from the first state based on the shape of the user's ear 10. For example, in the second wearing state, the electronic device 1000 may operate as a kernel-type audio output device (e.g., the earphone). For example, in the second wearing state, the electronic device 1000 may be more closely in contact with the user's ear 10 than in the first wearing state. For example, in the second wearing state, less external sound may enter the user's ear 10 together with the sound output from the electronic device 1000 (e.g., the speaker).

According to various embodiments of the disclosure, in the state in which the user is wearing the electronic device 1000, a coupling structure (e.g., the coupling structure 370 in FIG. 3, the coupling structure 470 in FIGS. 4A, 4B, and 4C, the coupling structure 570 in FIG. 5, the coupling structure 670 in FIGS. 6A and 6B, or the coupling structure 770 in FIG. 7) and the fixing member (e.g., the fixing member 390 in FIG. 3, the fixing members 491 in FIG. 4B and 493 in FIG. 4C, the fixing members 691 in FIG. 6A and 693 in FIG. 6B, or the fixing member 790 in FIG. 7) detachable from the coupling structure may be placed in a portion where the housing of the electronic device 1000 is in contact with the antihelix of the user's ear 10. According to an embodiment of the disclosure, the fixing member may be in contact with the user's ear 10 to assist in maintaining the worn state of the electronic device 1000. According to an embodiment of the disclosure, at least a portion of the fixing member may be formed to have the elasticity so as to be deformable, and be fixed to the user's ear 10 in a state of being partially deformed corresponding to the shape of the user's ear 10. According to various embodiments of the disclosure, the fixing member may have various sizes or shapes. For example, the user may increase a comport of wearing of the electronic device 1000 by wearing the electronic device 1000 using the fixing member suitable for the ear 10 thereof.

According to an embodiment of the disclosure, the electronic device 1000 may recognize the state in which the user is wearing the electronic device 1000 using at least one of the at least one microphone (e.g., the input module 150 in FIG. 1, the at least one microphone 210 in FIG. 2, the microphones 311 and 313 in FIG. 3, the microphones 511 and 513 in FIG. 5, or the microphones 611 and 613 in FIGS. 6A and 6B), the speaker (e.g., the sound output module 155 in FIG. 1, the speaker 220 in FIG. 2, the speaker 320 in FIG. 3, the speaker 420 in FIGS. 4A, 4B, and 4C, or the speaker 520 in FIG. 5), and the sensor (e.g., the sensor module 176 in FIG. 1, the at least one sensor 230 in FIG. 2, the sensor 330 in FIG. 3, the sensor 430 in FIGS. 4A, 4B, and 4C, the sensor 530 in FIG. 5, and the sensor 630 in FIGS. 6A and 6B). For example, the electronic device 1000 may recognize the first wearing state and the second wearing state.

For example, the electronic device 1000 may output a low-frequency signal equal to or lower than the specified frequency in the direction of the user's body (e.g., the ear 10) via the speaker. For example, the low-frequency signal may be the signal of the frequency band lower than the user's audible range. For example, the low-frequency signal output via the speaker may be reflected from the user's body. For example, the low-frequency signal reflected from the user's body may be received via the at least one microphone. For example, because a position of the speaker with respect to the user's ear 10 and a degree of close contact between the electronic device 1000 and the user's ear 10 in the first wearing state are different from those in the second wearing state, a volume of the low-frequency signal received by the electronic device 1000 via the microphone in the first wearing state may be different that in the second wearing state. For example, the electronic device 1000 may recognize whether the state in which the user is wearing the electronic device 1000 is the first wearing state or the second wearing state based on the low-frequency signal (e.g., the volume of the signal) received via the microphone.

For example, when each of a first microphone and a second microphone receives the external sound of the electronic device 1000, the electronic device 1000 may recognize the state in which the user is wearing the electronic device 1000 based on a difference between a volume of the sound received by the first microphone and a volume of the sound received by the second microphone. For example, when the first microphone and the second microphone are disposed to be spaced apart from each other by a specified spacing, even for the same external sound, the volume of the sound received by each of the first microphone and the second microphone in the first wearing state may be different from that in the second wearing state. For example, in the second wearing state, one microphone (e.g., the second microphone) is inserted more into the user's ear 10, so that the difference in the volume of the sound received by the first microphone and the second microphone may become greater. For example, the electronic device 1000 may recognize the worn state of the electronic device 1000 as the first wearing state when the difference in the volume of the sound received by the first microphone and the second microphone is lower than a specified value, and recognize the worn state of the electronic device 1000 as the second wearing state when the difference in the volume of the sound received by the first microphone and the second microphone is equal to or higher than the specified value.

For example, the electronic device 1000 may recognize the state in which the user is wearing the electronic device 1000 based on a value sensed using the at least one sensor. For example, a distance between the electronic device 1000 (e.g., the sensor) and the user's ear 10 may be shorter in the second wearing state in which the electronic device 1000 is inserted deeper into and more closely in contact with the user's ear 10 than in the first wearing state. For example, the electronic device 1000 may recognize the worn state of the electronic device 1000 based on the distance between the electronic device 1000 and the user's body measured using the at least one sensor.

According to an embodiment of the disclosure, the electronic device 1000 may control a function of the electronic device 1000 based on the state in which the user is wearing the electronic device 1000. For example, the electronic device 1000 may deactivate the noise cancellation function when the worn state of the electronic device 1000 is the first wearing state, and activate the noise cancellation function when the worn state of the electronic device 1000 is the second wearing state. For example, the electronic device 1000 may adjust (compensate for) the performance of the noise cancellation function based on the worn state of the electronic device 1000. For example, the electronic device 1000 may compensate for the anti-noise signal (e.g., adjust a magnitude of the anti-noise signal) output for the noise cancellation function based on the first wearing state or the second wearing state. For example, the electronic device 1000 may increase the volume of the sound output via the speaker in the first wearing state or decrease the volume of the sound output via the speaker in the second wearing state. Alternatively, the electronic device 1000 may decrease the volume of the sound output via the speaker in the first wearing state or increase the volume of the sound output via the speaker in the second wearing state. For example, the electronic device 1000 may adjust the characteristics (e.g., the equalizer (EQ)) of the sound output via the speaker based on the state in which the user is wearing the electronic device 1000.

Figure 11A:
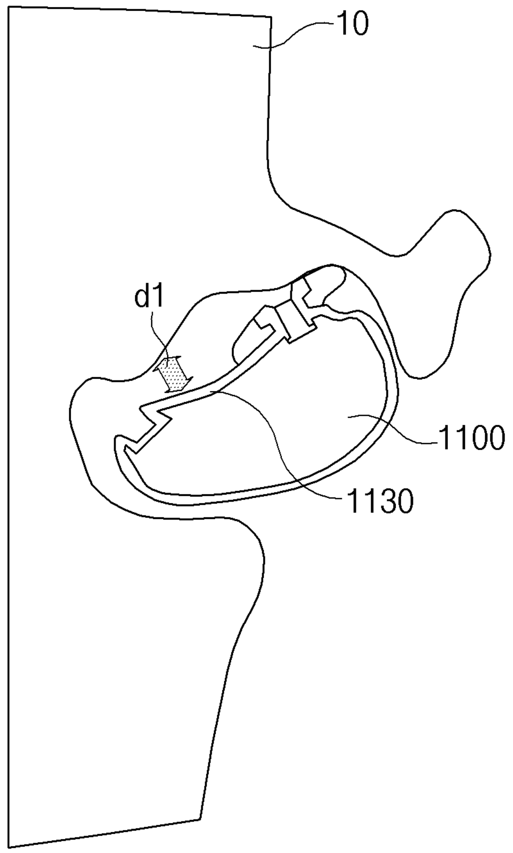
FIGS. 11A and 11B are diagrams for illustrating an operation of an electronic device according to various embodiments of the disclosure.
Figure 11B:
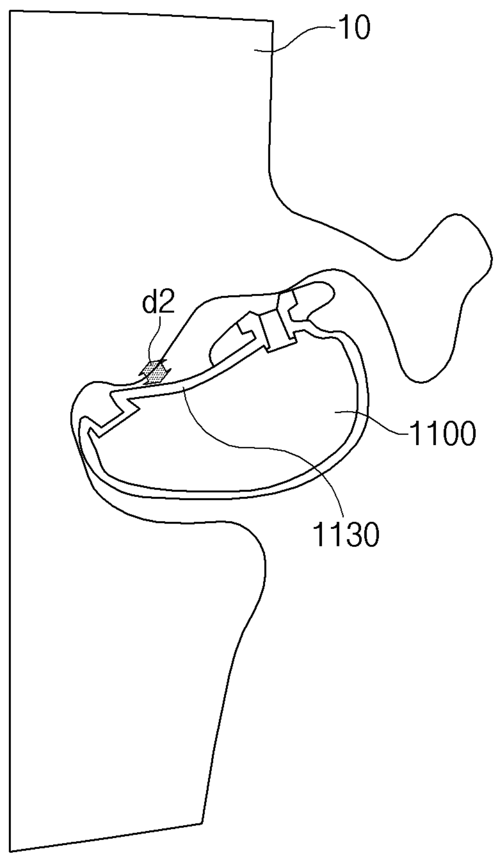

FIGS. 11A and 11B are diagrams for illustrating an operation of an electronic device 1100 (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, the electronic device 600 in FIGS. 6A and 6B, the electronic device 700 in FIG. 7, or the electronic device 1000 in FIGS. 10B and 10C) according to various embodiments of the disclosure. For example, FIGS. 11A and 11B show top views in the first wearing state and the second wearing state when the user is wearing the electronic device 1100.

According to an embodiment of the disclosure, the electronic device 1100 may have the plurality of wearing state. For example, referring to FIG. 11A, the first wearing state may be a state in which the electronic device 1100 is worn less deeply inside the user's body (e.g., the ear 10). For example, referring to FIG. 11B, the second wearing state may be a state in which the electronic device 1100 is worn more deeply inside the user's body (e.g., the ear 10).

According to an embodiment of the disclosure, the electronic device 1100 may include at least one sensor 1130 (e.g., the sensor module 176 in FIG. 1, the at least one sensor 230 in FIG. 2, the sensor 330 in FIG. 3, the sensor 430 in FIGS. 4A, 4B, and 4C, the sensor 530 in FIG. 5, and the sensor 630 in FIGS. 6A and 6B) disposed in a housing disposed inside of the user's ear 10. According to an embodiment of the disclosure, the electronic device 1100 may recognize the state in which the user is wearing the electronic device 1100 via the sensor 1130. For example, a distance d1 between the electronic device 1100 and the user's body (e.g., the ear 10) in the first wearing state in FIG. 11A may be greater than a distance d2 between the electronic device 1100 and the user's body in the second wearing state in FIG. 11B. For example, the electronic device 1100 may recognize whether the worn state of the electronic device 1100 is the first wearing state or the second wearing state based on the distance between the electronic device 1100 and the user's body measured via the sensor 1130. According to an embodiment of the disclosure, the electronic device 1100 may control a function (e.g., the noise cancellation function, the volume adjustment, and/or the EQ adjustment) of the electronic device 1100 based on the worn state of the electronic device 1100.

An electronic device according to an embodiment of the disclosure may include a housing formed so as to be worn in at least a part of a user's body, at least one microphone, a speaker, at least one sensor, and a processor operatively connected to the at least one microphone, the speaker, and the at least one sensor. According to an embodiment of the disclosure, the processor may recognize a state of the electronic device worn in at least the part of the user's body using at least one of the at least one microphone, the speaker, and the at least one sensor, and control a function of the electronic device based on the worn state.

According to an embodiment of the disclosure, the processor may activate or deactivate an active noise canceling (ANC) function based on the worn state.

According to an embodiment of the disclosure, the processor may adjust a volume of a sound output via the speaker based on the worn state.

According to an embodiment of the disclosure, the processor may output a signal having a frequency lower than a specified frequency toward the user's body via the speaker, receive the signal having the frequency lower than the specified frequency reflected from the user's body via the microphone, and recognize the worn state based on the reflected signal received via the microphone.

According to an embodiment of the disclosure, the processor may output the signal having the frequency lower than the specified frequency via the speaker when a change in a value sensed using the at least one sensor is equal to or higher than a specified value.

According to an embodiment of the disclosure, the at least one microphone may include a first microphone and a second microphone disposed to be spaced apart from each other at a specified spacing.

According to an embodiment of the disclosure, the processor may recognize the worn state based on a difference between a volume of an external sound received via the first microphone and a volume of an external sound received via the second microphone.

According to an embodiment of the disclosure, the at least one sensor may include a proximity sensor or a contact sensor. According to an embodiment of the disclosure, the processor may recognize the worn state using the proximity sensor or the contact sensor.

According to an embodiment of the disclosure, at least a portion of the housing may include an outwardly protruding coupling structure. According to an embodiment of the disclosure, the electronic device may further include a fixing member detachable from the coupling structure, wherein the fixing member is constructed to maintain the state of the electronic device worn in at least the part of the user's body.

According to an embodiment of the disclosure, at least a portion of the fixing member may include a space defined such that at least the portion of the fixing member is able to be deformed with elasticity.

According to an embodiment of the disclosure, the processor may adjust characteristics of a sound output via the speaker based on the worn state.

According to an embodiment of the disclosure, the worn state may include a first wearing state and a second wearing state of a user.

Figure 12:
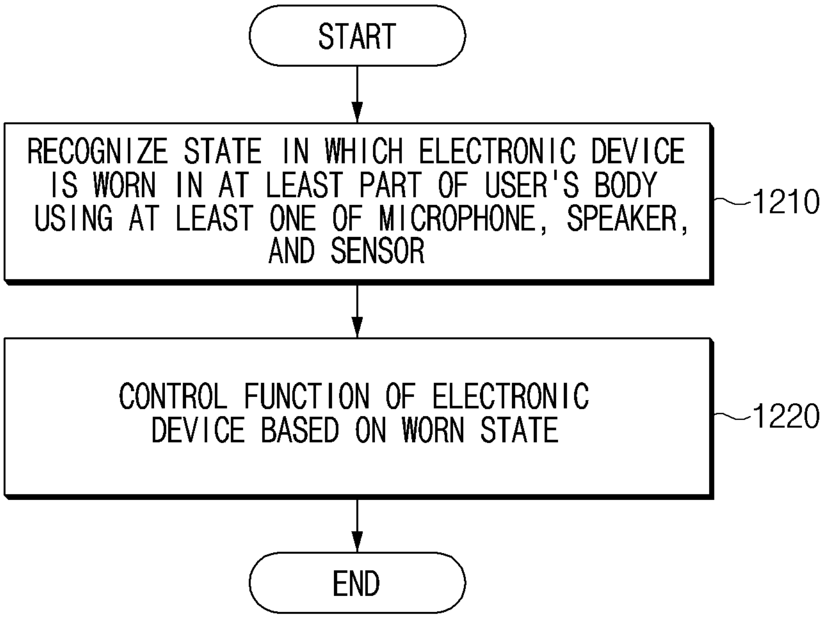
FIG. 12 is a flowchart of a method of operating an electronic device according to an embodiment of the disclosure.

FIG. 12 is a flowchart of a method of an electronic device according to an embodiment of the disclosure.

According to an embodiment of the disclosure, in operation 1210, an electronic device (e.g., the electronic device 101 in FIG. 1, the electronic device 200 in FIG. 2, the electronic devices 301 and 303 in FIG. 3, the electronic device 400 in FIGS. 4A, 4B, and 4C, the electronic device 500 in FIG. 5, the electronic device 600 in FIGS. 6A and 6B, the electronic device 700 in FIG. 7, the electronic device 1000 in FIGS. 10B and 10C, or the electronic device 1100 in FIGS. 11A and 11B) may recognize a state in which the electronic device is worn in at least the part of the user's body using at least one of at least one microphone (e.g., the input module 150 in FIG. 1, the at least one microphone 210 in FIG. 2, the microphones 311 and 313 in FIG. 3, the microphones 511 and 513 in FIG. 5, or the microphones 611 and 613 in FIGS. 6A and 6B), a speaker (e.g., the sound output module 155 in FIG. 1, the speaker 220 in FIG. 2, the speaker 320 in FIG. 3, the speaker 420 in FIGS. 4A, 4B, and 4C, or the speaker 520 in FIG. 5), a sensor (e.g., the sensor module 176 in FIG. 1, the at least one sensor 230 in FIG. 2, the sensor 330 in FIG. 3, the sensor 430 in FIGS. 4A, 4B, and 4C, the sensor 530 in FIG. 5, and the sensor 630 in FIGS. 6A and 6B), and at least one sensor (e.g., the sensor module 176 in FIG. 1, the at least one sensor 230 in FIG. 2, the sensor 330 in FIG. 3, the sensor 430 in FIGS. 4A, 4B, and 4C, the sensor 530 in FIG. 5, the sensor 630 in FIGS. 6A and 6B, or the sensor 1130 in FIGS. 11A and 11B). According to an embodiment of the disclosure, the worn state of the electronic device may include the first wearing state and the second wearing state. For example, the second wearing state may be a state in which the electronic device is worn more deeply inside the portion (e.g., the ear) of the user's body than in the first wearing state.

For example, the electronic device may output a low-frequency signal equal to or lower than the specified frequency in the direction of the user's body (e.g., the ear) via the speaker. For example, the low-frequency signal may be the signal of the frequency band lower than the user's audible range. For example, the low-frequency signal output via the speaker may be reflected from the user's body. For example, the low-frequency signal reflected from the user's body may be received via the at least one microphone. For example, the electronic device may recognize whether the state in which the user is wearing the electronic device is the first wearing state or the second wearing state based on the low-frequency signal (e.g., the volume of the signal) received via the microphone.

For example, when the electronic device includes a first microphone and a second microphone and each of the first microphone and the second microphone receives an external sound of the electronic device, the electronic device may recognize the state in which the user is wearing the electronic device based on a difference between a volume of the sound received by the first microphone and a volume of the sound received by the second microphone.

For example, the electronic device may recognize the state in which the user is wearing the electronic device based on a value sensed using the at least one sensor. For example, the electronic device may recognize the worn state of the electronic device based on a distance between the electronic device and the user's body measured using the at least one sensor or whether the electronic device and the user's body are in contact with each other.

According to an embodiment of the disclosure, in operation 1220, the electronic device may control a function of the electronic device based on the worn state. For example, the electronic device may deactivate the noise cancellation function when the worn state of the electronic device is the first wearing state, and activate the noise cancellation function when the worn state of the electronic device is the second wearing state. For example, the electronic device may increase the volume of the sound output via the speaker in the first wearing state or decrease the volume of the sound output via the speaker in the second wearing state. Alternatively, the electronic device may decrease the volume of the sound output via the speaker in the first wearing state or increase the volume of the sound output via the speaker in the second wearing state. For example, the electronic device may adjust characteristics (e.g., the equalizer (EQ)) of the sound output via the speaker based on the state in which the user is wearing the electronic device. For example, when the user sets the characteristics of the sound output via the speaker in the state of wearing the electronic device, the electronic device may output a sound having the specified (set) sound characteristic based on the recognized worn state of the electronic device and/or change in the worn state.

A method of operating an electronic device including a housing formed so as to be worn in at least a part of a user's body, at least one microphone, a speaker, and at least one sensor according to an embodiment may include recognizing a state of the electronic device worn in at least the part of the user's body using at least one of the at least one microphone, the speaker, and the at least one sensor, and controlling a function of the electronic device based on the worn state.

According to an embodiment of the disclosure, the controlling of the function of the electronic device may include activating or deactivating an active noise canceling (ANC) function based on the worn state.

According to an embodiment of the disclosure, the controlling of the function of the electronic device may include adjusting a volume of a sound output via the speaker based on the worn state.

According to an embodiment of the disclosure, the controlling of the function of the electronic device may include adjusting characteristics of a sound output via the speaker based on the worn state.

According to an embodiment of the disclosure, the recognizing of the worn state may include outputting a signal having a frequency lower than a specified frequency toward the user's body via the speaker, receiving the signal having the frequency lower than the specified frequency reflected from the user's body via the microphone, and recognizing the worn state based on the reflected signal received via the microphone.

According to an embodiment of the disclosure, the method may further include outputting the signal having the frequency lower than the specified frequency via the speaker when a change in a value sensed using the at least one sensor is equal to or higher than a specified value.

According to an embodiment of the disclosure, the at least one microphone may include a first microphone and a second microphone disposed to be spaced apart from each other at a specified spacing, and the recognizing of the worn state may include recognizing the worn state based on a difference between a volume of an external sound received via the first microphone and a volume of an external sound received via the second microphone.

According to an embodiment of the disclosure, the recognizing of the worn state may include recognizing the worn state based on a distance between the electronic device and at least the part of the user's body measured using the at least one sensor.

According to an embodiment of the disclosure, the worn state may include a first wearing state and a second wearing state of a user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities and some of multiple entities may be separately disposed on the other components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing formed so as to be worn in at least a part of a user's body;

at least one microphone;

a speaker;

at least one sensor;

memory, comprising one or more storage media, storing instructions; and at least one processor, wherein the instructions, when executed by the at least one processor individually or collectively, cause the electronic device to:

identify a state of the electronic device stably worn in at least the part of the user's body using at least one of the at least one microphone, the speaker, or the at least one sensor, wherein the state includes a first wearing state and a second wearing state in which the electronic device is stably worn in the at least the part of the user's body, deactivate an active noise canceling (ANC) function or increase a volume of a sound output via the speaker in comparison to the second wearing state based on identifying that the state of the electronic device is the first wearing state, and activate the active noise canceling (ANC) function or decrease the volume of the sound output via the speaker in comparison to the first wearing state based on identifying that the state of the electronic device is the second wearing state, wherein the electronic device includes an audio output device worn on the user's ear, wherein, in the first wearing state, the electronic device is inserted relatively less deeply into the user's ear than in the second wearing state and operates as an open-type audio output device, and wherein, in the second wearing state, the electronic device is inserted relatively deeper into the user's ear than in the first wearing state and operates as a kernel-type audio output device.

2. The electronic device of claim 1, wherein the instructions, when executed by the at least one processor individually or collectively, further cause the electronic device to:

output a signal having a frequency lower than a specified frequency toward the user's body via the speaker, receive the signal having the frequency lower than the specified frequency reflected from the user's body via the at least one microphone, and identify the worn state based on the reflected signal received via the at least one microphone.

3. The electronic device of claim 2, wherein the instructions, when executed by the at least one processor individually or collectively, further cause the electronic device to output the signal having the frequency lower than the specified frequency via the speaker when a change in a value sensed using the at least one sensor is equal to or higher than a specified value.

4. The electronic device of claim 1, wherein the at least one microphone includes a first microphone and a second microphone disposed to be spaced apart from each other at a specified spacing, and wherein the instructions, when executed by the at least one processor individually or collectively, further cause the electronic device to identify the worn state based on a difference between a volume of an external sound received via the first microphone and a volume of the external sound received via the second microphone.

5. The electronic device of claim 1, wherein the at least one sensor includes a proximity sensor or a contact sensor, and wherein the instructions, when executed by the at least one processor individually or collectively, further cause the electronic device to identify the state using the proximity sensor or the contact sensor.

6. The electronic device of claim 1, wherein at least a portion of the housing includes an outwardly protruding coupling structure, wherein the electronic device further includes a fixing member detachable from the coupling structure, and wherein the fixing member is constructed to maintain the state of the electronic device worn in at least the part of the user's body.

7. The electronic device of claim 6, wherein at least a portion of the fixing member includes a space defined such that at least the portion of the fixing member is able to be deformed with elasticity.

8. The electronic device of claim 1, wherein the instructions, when executed by the at least one processor individually or collectively, further cause the electronic device to adjust characteristics of a sound output via the speaker based on the state.

9. A method of operating an electronic device including a housing formed so as to be worn in at least a part of a user's body, at least one microphone, a speaker, and at least one sensor, the method comprising:

identifying a state of the electronic device worn in at least the part of the user's body using at least one of the at least one microphone, the speaker, or the at least one sensor, wherein the state includes a first wearing state and a second wearing state in which the electronic device is stably worn in the at least the part of the user's body;

based on identifying that the state of the electronic device is the first wearing state, deactivating an active noise canceling (ANC) function or increasing a volume of a sound output via the speaker in comparison to the second wearing state; and based on identifying that the state of the electronic device is the second wearing state, activating the active noise canceling (ANC) function or decreasing the volume of the sound output via the speaker in comparison to the first wearing state, wherein the electronic device includes an audio output device worn on the user's ear, wherein, in the first wearing state, the electronic device is inserted relatively less deeply into the user's ear than in the second wearing state and operates as an open-type audio output device, and wherein, in the second wearing state, the electronic device is inserted relatively deeper into the user's ear than in the first wearing state and operates as a kernel-type audio output device.

10. The method of claim 9, further comprising:

adjusting characteristics of a sound output via the speaker based on the state.

11. The method of claim 9, wherein the identifying of the worn state includes:

outputting a signal having a frequency lower than a specified frequency toward the user's body via the speaker;

receiving the signal having the frequency lower than the specified frequency reflected from the user's body via the at least one microphone; and identifying the worn state based on the reflected signal received via the at least one microphone.

12. The method of claim 11, further comprising:

outputting the signal having the frequency lower than the specified frequency via the speaker when a change in a value sensed using the at least one sensor is equal to or higher than a specified value.

13. The method of claim 9, wherein the at least one microphone includes a first microphone and a second microphone disposed to be spaced apart from each other at a specified spacing, and wherein the identifying of the worn state includes identifying the state based on a difference between a volume of an external sound received via the first microphone and a volume of the external sound received via the second microphone.

14. The method of claim 9, wherein the identifying of the worn state includes identifying the state based on a distance between the electronic device and at least the part of the user's body measured using the at least one sensor.

* * * * *